(12) United States Patent
Park et al.

(10) Patent No.: US 12,073,309 B2
(45) Date of Patent: Aug. 27, 2024

(54) NEURAL NETWORK DEVICE AND METHOD OF QUANTIZING PARAMETERS OF NEURAL NETWORK

(71) Applicant: SAMSUNG ELECTRONICS CO., LTD., Suwon-si (KR)

(72) Inventors: Juhee Park, Gwacheon-si (KR); Doyun Kim, Gwacheon-si (KR); Sanghyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1119 days.

(21) Appl. No.: 16/786,462

(22) Filed: Feb. 10, 2020

(65) Prior Publication Data

US 2021/0004663 A1    Jan. 7, 2021

(30) Foreign Application Priority Data

Jul. 4, 2019    (KR) .................. 10-2019-0080543

(51) Int. Cl.
*G06N 3/063* (2023.01)
*G06N 3/047* (2023.01)
(Continued)

(52) U.S. Cl.
CPC .......... *G06N 3/063* (2013.01); *G06N 3/047* (2023.01); *G06N 3/08* (2013.01); *G06V 10/70* (2022.01); *G06V 10/82* (2022.01); *G06V 10/454* (2022.01)

(58) Field of Classification Search
CPC .......... G06N 3/063; G06N 3/047; G06N 3/08; G06N 3/045; G06N 3/04; G06V 10/70; G06V 10/82; G06V 10/454; G06F 18/21
See application file for complete search history.

(56) References Cited

U.S. PATENT DOCUMENTS

| 11,423,313 B1* | 8/2022 | Diamant ................ G06N 3/048 |
| 2016/0328646 A1 | 11/2016 | Lin et al. |

(Continued)

FOREIGN PATENT DOCUMENTS

| WO | 2016/182671 A1 | 11/2016 |
| WO | 2019/008752 A1 | 1/2019 |

OTHER PUBLICATIONS

Lai, Liangzhen et al. "Deep Convolutional Neural Network Inference with Floating-Point Weights and Fixed-Point Activations", Mar. 2017, ARM Research, arXiv: 1703.03073v1.*

(Continued)

*Primary Examiner* — Li B. Zhen
*Assistant Examiner* — Henry Nguyen
(74) *Attorney, Agent, or Firm* — Sughrue Mion, PLLC

(57) ABSTRACT

A neural network device includes a quantization parameter calculator configured to quantize parameters of a neural network that is pre-trained, so that the quantized parameters are of mixed data types, analyze a statistical distribution of parameter values of an M-bit floating-point type, the parameter values being associated with at least one layer of the neural network, M being a natural number greater than three, obtain a quantization level of each of the parameters statistically covering a distribution range of the parameter values, based on the analyzed statistical distribution, and quantize input data and weights of the M-bit floating-point type into asymmetric input data of an N-bit fixed-point type and weights of an N-bit floating-point type, using quantization parameters that are obtained based on the obtained quantization level of each of the parameters, N being a natural number greater than one and less than M.

17 Claims, 16 Drawing Sheets

(51) Int. Cl.
*G06N 3/08* (2023.01)
*G06V 10/70* (2022.01)
*G06V 10/82* (2022.01)
*G06V 10/44* (2022.01)

(56) References Cited

U.S. PATENT DOCUMENTS

| | | | |
|---|---|---|---|
| 2017/0220929 A1* | 8/2017 | Rozen | G06F 7/483 |
| 2017/0286830 A1 | 10/2017 | El-Yaniv et al. | |
| 2018/0046913 A1 | 2/2018 | Yu et al. | |
| 2018/0322382 A1* | 11/2018 | Mellempudi | G06N 3/084 |
| 2018/0341857 A1 | 11/2018 | Lee et al. | |
| 2019/0012559 A1 | 1/2019 | Desappan et al. | |
| 2019/0042935 A1 | 2/2019 | Deisher | |
| 2019/0042948 A1 | 2/2019 | Lee et al. | |
| 2019/0050710 A1* | 2/2019 | Wang | G06N 3/063 |
| 2019/0188557 A1* | 6/2019 | Lowell | G06N 3/063 |
| 2020/0184318 A1 | 6/2020 | Minezawa et al. | |

OTHER PUBLICATIONS

Lai, Liangzhen et al., "Deep Convolutional Neural Network Inference with Floating-point Weights and Fixed-point Activations", arXiv:1703.03073v1. [cs.LG], Mar. 8, 2017. (10 pages total).
Jacob, B. et al., "Quantization and Training of Neural Networks for Efficient Integer-Arithmetic-Only Inference", arXiv:1712.05877v1, [cs.LG], Dec. 15, 2017. (14 pages total).
Communication issued Jun. 20, 2024 from the Korean Patent Office in Korean Patent Application No. 10-2019-0080543.
IntelLabs, "distiller v0.3.2: docs/algo_quantization.html", 2019, URL: <https://github.com/IntelLabs/distiller/commits/ v0.3.2/docs/algo_quantization.html > (7 pages total).

* cited by examiner

FIG. 8
<Dynamic range vs. Accuracy>
-Q2.0 vs Q1.1 (BIT WIDTH:3)
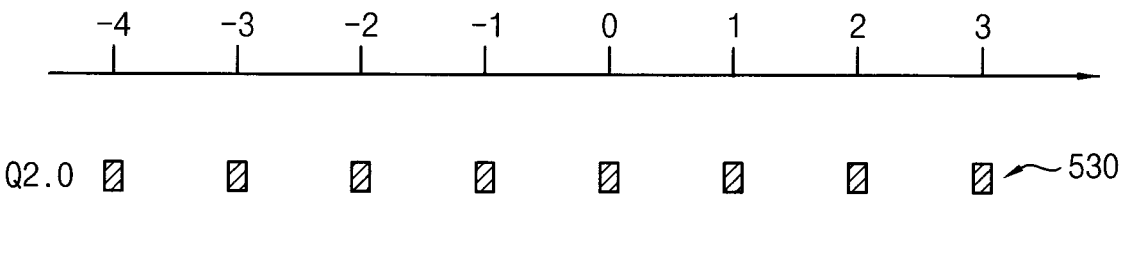
- In given Bit width
Fraction length ↑    range ↓, accuracy ↑
Fraction length ↓    range ↑, accuracy ↓

FIG. 13A $IDATA. \ e \times 2^f \rightarrow QIDTA:Qm.n(m+n=N-1)$

FIG. 13B $Wnew = a' \times 2^{b'-bse}$

DETERMINE A FIRST STEP SIZE, A SECOND STEP SIZE, A FIRST ZERO POINT AND A SECOND ZERO POINT BASED ON THE QUANTIZATION LEVEL, A MAXIMUM VALUE OF THE STATISTICAL DISTRIBUTION AND A MINIMUM VALUE OF THE STATISTICAL DISTRIBUTION ~S310

DETERMINE A NEW WEIGHT BASED ON THE FIRST STEP SIZE AND THE SECOND STEP SIZE ~S320

DETERMINE A BIAS ASSOCIATED WITH THE OUTPUT DATA BASED ON THE NEW WEIGHT ~S330

NEURAL NETWORK DEVICE AND METHOD OF QUANTIZING PARAMETERS OF NEURAL NETWORK

CROSS-REFERENCE TO THE RELATED APPLICATION

This application is based on and claims priority under 35 U.S.C. § 119 to Korean Patent Application No. 10-2019-0080543, filed on Jul. 4, 2019, in the Korean Intellectual Property Office (KIPO), the disclosure of which is incorporated by reference herein in its entirety.

BACKGROUND

1. Field

The disclosure relates to a neural network, and more particularly to a neural network device and a method of quantizing parameters of a neural network, which use mixed-type data.

2. Description of the Related Art

A neural network refers to a computational architecture that models a biological brain. Recently, with the development of neural network technology, various kinds of electronic systems have been actively studied for analyzing input data and extracting valid information, using a neural network device. The neural network device may use a large amount of computations for complex input data. In order for the neural network device to analyze high-quality input in real time and extract information, technology capable of efficiently processing neural network operations may be used.

SUMMARY

According to embodiments, a neural network device includes a quantization parameter calculator configured to quantize parameters of a neural network that is pre-trained, so that the quantized parameters are of mixed data types, and a processor configured to apply the quantized parameters to the neural network. The quantization parameter calculator is further configured to analyze a statistical distribution of parameter values of an M-bit floating-point type, the parameter values being associated with at least one layer of the neural network, M being a natural number greater than three, obtain a quantization level of each of the parameters statistically covering a distribution range of the parameter values, based on the analyzed statistical distribution, and quantize input data and weights of the M-bit floating-point type into asymmetric input data of an N-bit fixed-point type and weights of an N-bit floating-point type, using quantization parameters that are obtained based on the obtained quantization level of each of the parameters, N being a natural number greater than one and less than M.

According to embodiments, a neural network device includes a quantization parameter calculator configured to quantize parameters of a neural network that are pre-trained, so that the quantized parameters are of mixed data types, and a processor configured to apply the quantized parameters to the neural network. The quantization parameter calculator includes a logic circuit configured to quantize input data and weights of an M-bit floating-point type into asymmetric input data of an N-bit fixed-point type and weights of an N-bit floating-point type, using quantization parameters, a control circuit configured to control the logic circuit, an input register and an weight register configured to store the quantization parameters, and a result register configured to store the asymmetric input data of the N-bit fixed-point type and the weights of the N-bit floating-point type.

According to embodiments, a method of quantizing parameters of a neural network, includes analyzing a statistical distribution of parameter values of an M-bit floating-point type, the parameter values being associated with at least one layer of the neural network, M being a natural number greater than three. The method further includes obtaining a quantization level of each of the parameters statistically covering a distribution range of the parameter values, based on the analyzed statistical distribution, and quantizing input data and weights of the M-bit floating-point type into asymmetric input data of an N-bit fixed-point type and weights of an N-bit floating-point type, using quantization parameters that are obtained based on the obtained quantization level of each of the parameters, N being a natural number greater than one and less than M. The method further includes applying, to the neural network, the asymmetric input data of the N-bit fixed-point type and the weights of the N-bit floating-point type.

BRIEF DESCRIPTION OF THE DRAWINGS

FIG. 8 is a diagram illustrating an example of a relationship between a fractional length and an accuracy of a fixed-point value.

FIG. 13A illustrates quantized input data provided from a quantization parameter calculator.

FIG. 13B illustrates quantized weights provided from a quantization parameter calculator.

FIG. 14 is a flowchart illustrating an operation of quantizing input data and weights in FIG. 1, according to embodiments.

DETAILED DESCRIPTION OF THE EMBODIMENTS

Figure 1:
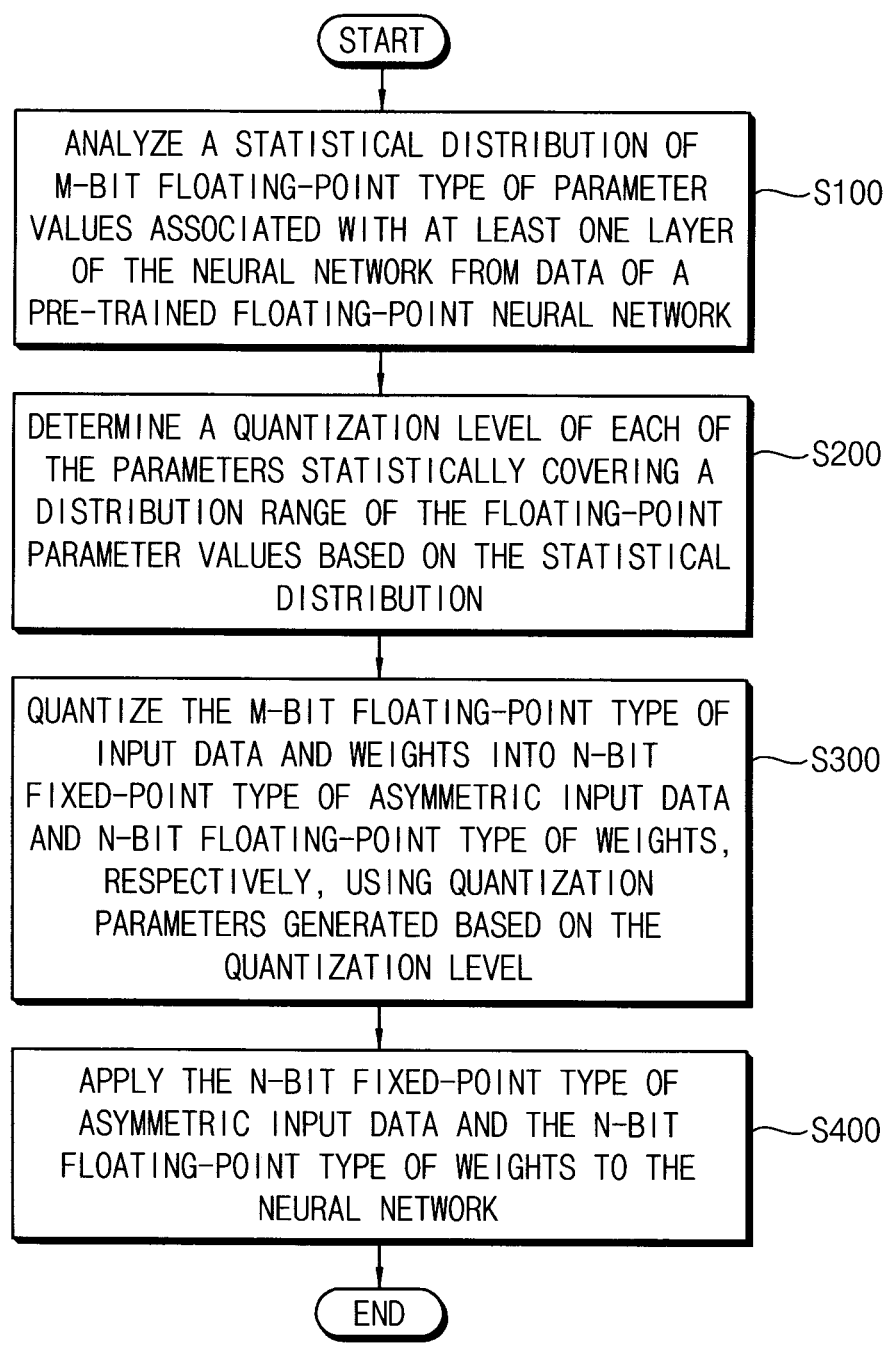
FIG. 1 is a flowchart illustrating a method of quantizing parameters of a neural network, according to embodiments.

Embodiments provide a neural network device capable of increasing a a dynamic range and an accuracy.

Embodiments provide a method of quantizing parameters of a neural network, capable of increasing a dynamic range and an accuracy.

In detail, a quantization parameter calculator quantizes an M-bit floating-point type of input data and weights into N-bit fixed-point type of asymmetric input data and N-bit floating-point type of weights, respectively, based on a quantization level that minimizes quantization error in advance. A processor applies the quantized input data and the quantized weights to a neural network. Therefore, a neural network device may increase a dynamic range and an accuracy, and may increase a computing speed and reduce a power consumption by separating quantization and application of the quantized data to the neural network.

The embodiments will be described more fully hereinafter with reference to the accompanying drawings. In the drawings, like numerals refer to like elements throughout. The repeated descriptions may be omitted.

FIG. 1 is a flowchart illustrating a method of quantizing parameters of a neural network, according to embodiments.

Referring to FIG. 1, in operation S100, a statistical distribution of M-bit floating-point type of parameter values is analyzed. The parameter values are associated with at least one layer of the neural network from data of a pre-trained floating-point neural network, and M is a natural number greater than three. A neural network is one of machine learning scheme, which is an operation model of software and/or hardware emulating a biological system using many artificial neurons connected through connection lines. The neural network uses the artificial neurons having simplified functions of the biological neurons and the artificial neurons are connected through connection lines of predetermined connection strengths to perform recognition or learning of human being. Recently deep learning is being studied to overcome limitation of the neural network. The deep learning neural network structure will be described below with reference to FIGS. 3A and 3B.

In operation S200, a quantization level of each of the parameters statistically covering a distribution range of the floating-point parameter values is determined based on the statistical distribution. The determination of the quantization level will be described below with reference to FIGS. 9 through 11.

In operation S300, the M-bit floating-point type of input data and weights are quantized into N-bit fixed-point type of asymmetric input data and N-bit floating-point type of weights, respectively, using quantization parameters generated based on the quantization level. N is a natural number greater than one and smaller than M.

In operation S400, the quantized N-bit fixed-point type of asymmetric input data and the quantized N-bit floating-point type of weight are applied to the neural network, and a quantized neural network is generated.

In the conventional scheme for quantizing floating-point type of input data and weights, it is difficult to increasing both of accuracy and dynamic range. For increasing the accuracy, the dynamic range is degraded and for increasing the dynamic range, the accuracy is degraded. However, according to examples, the M-bit floating-point type of input data and weights are quantized into N-bit fixed-point type of asymmetric input data and N-bit floating-point type of weights, respectively, in advance, and the quantized N-bit fixed-point type of asymmetric input data and the quantized N-bit floating-point type of weight are applied to the neural network to generate the quantized neural network. Therefore, it is possible to increasing both of the accuracy and the dynamic range.

Figure 2:
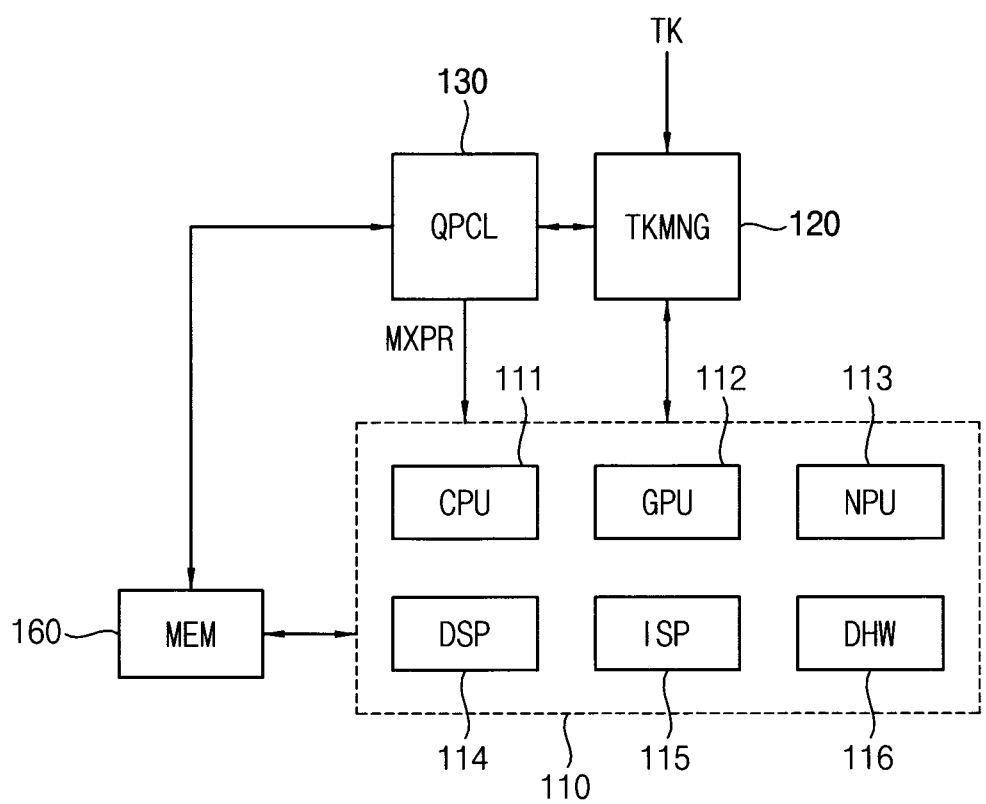
FIG. 2 is a block diagram illustrating a neural network device according to embodiments.

FIG. 2 is a block diagram illustrating a neural network device according to embodiments.

Referring to FIG. 2, a neural network device 100 may include a plurality of processors 110, a task manager TKMNG 120, a quantization parameter calculator QPCL 130 and a memory MEM 160.

The neural network device 100 may be driven by the plurality of processors 110. For example, the plurality of processors 110 may include heterogeneous processors as illustrated in FIG. 2. According to examples, the plurality of processors 110 may include at least two homogeneous processors. Various services (e.g., a task TK or an application) such as an image classify service, a user authentication service, an advanced driver assistance system (ADAS) service, and/or a voice assistant service may be executed and processed by the plurality of processors 110. The task TK may include any one or any combination of a plurality of operations or arithmetic operations. For example, the task TK may represent applications such as an image classification service, a user authentication service based on biological information, ADAS service, a voice assistant service, etc. For example, the plurality of operations may include various operations such as a convolution operation, a rectified linear unit (RELU) operation, etc.

According to an embodiment, the quantization parameter calculator QPCL 130 and at least one of the plurality processors 110 may be, respectively, embodied as various numbers of hardware, software and/or firmware structures that execute respective functions described herein. For example, they may use a direct circuit structure, such as a memory, a processor, a logic circuit, a look-up table, etc. that may execute the respective functions through controls of one or more microprocessors or other control apparatuses. Also, they may be specifically embodied by a module, a program, or a part of code, which contains one or more executable instructions for performing specified logic functions, and executed by one or more microprocessors or other control apparatuses. Further, they may include or may be implemented by a microprocessor such as a central processing unit (CPU) that performs the respective functions. They may be combined into one single component which performs all operations or functions to be respectively performed by them.

According to an embodiment, the plurality of processors 110 may include a central processing unit (CPU) 111, a graphic processing unit (GPU) 112, a neural processing unit (NPU) 113, a digital signal processor (DSP) 114, an image signal processor (ISP) 115 and a dedicated hardware (DHW) 116.

For example, the dedicated hardware 116 may include a vision processing unit (VPU), a vision intellectual property (VIP), etc. Each processor may be referred to as a processing element (PE).

Although FIG. 2 illustrates only computing resources as examples of the plurality of processors 110, the plurality of processors 110 may further include communication resources such as a direct memory access unit (DMA) for controlling access to the memory 160, a connectivity for supporting various internal and/or external communications, or the like.

The task manager 120 receives the task TK that is to be performed from an external device or by a user, manages or schedules the received task TK, and assigns the task TK to the plurality of processors 110. For example, the task manager 120 may assign operations included in the task TK to the plurality of processors 110, and generate path information that indicates a computing path for the task TK. The computing path for the task TK may include a sequence of the operations included in the task TK and a driving sequence of processors for performing the operations included in the task TK.

The quantization parameter calculator 130 may analyze a statistical distribution of M-bit floating-point type of parameter values associated with at least one layer of the neural network from data of a pre-trained floating-point neural network, may determine a quantization level of each of the parameters statistically covering a distribution range of the floating-point parameter values based on the statistical distribution and quantize the M-bit floating-point type of input data and weights into N-bit fixed-point type of asymmetric input data and N-bit floating-point type of weights, respectively, using quantization parameters generated based on the quantization level, and may provide the processors 110 with a mixed type of quantized parameters MXPR including the quantized N-bit fixed-point type of asymmetric input data and the quantized N-bit floating-point type of weights. That is, the quantization parameter calculator 130 may perform operations S100, S200 and S300 in FIG. 1.

Any one or any combination of the processors 110 may apply the quantized N-bit fixed-point type of asymmetric input data and the quantized N-bit floating-point type of weights to the neural network. That is, any one or any combination of the processors 110 may perform operation S400 in FIG. 1.

The memory 160 may store various data that are processed by the neural network device 100. In examples, the memory 160 may include at least one volatile memory such as a dynamic random access memory (DRAM), a synchronous DRAM (SDRAM), a static random access memory (SRAM), etc., and/or at least one nonvolatile memory such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), etc.

Although FIG. 2 illustrates only data/signal transmission flows between some elements in the neural network device 100, all elements in the neural network device 100 may be connected to one another via at least one bus, and thus all elements in the neural network device 100 may be communicate with one another via the at least one bus.

The neural network device 100 may further include software elements, e.g., a framework, a kernel or a device driver, a middleware, an application programming interface (API), an application program or an application, or the like. At least a portion of the software elements may be referred to as an operating system (OS).

Figure 3:
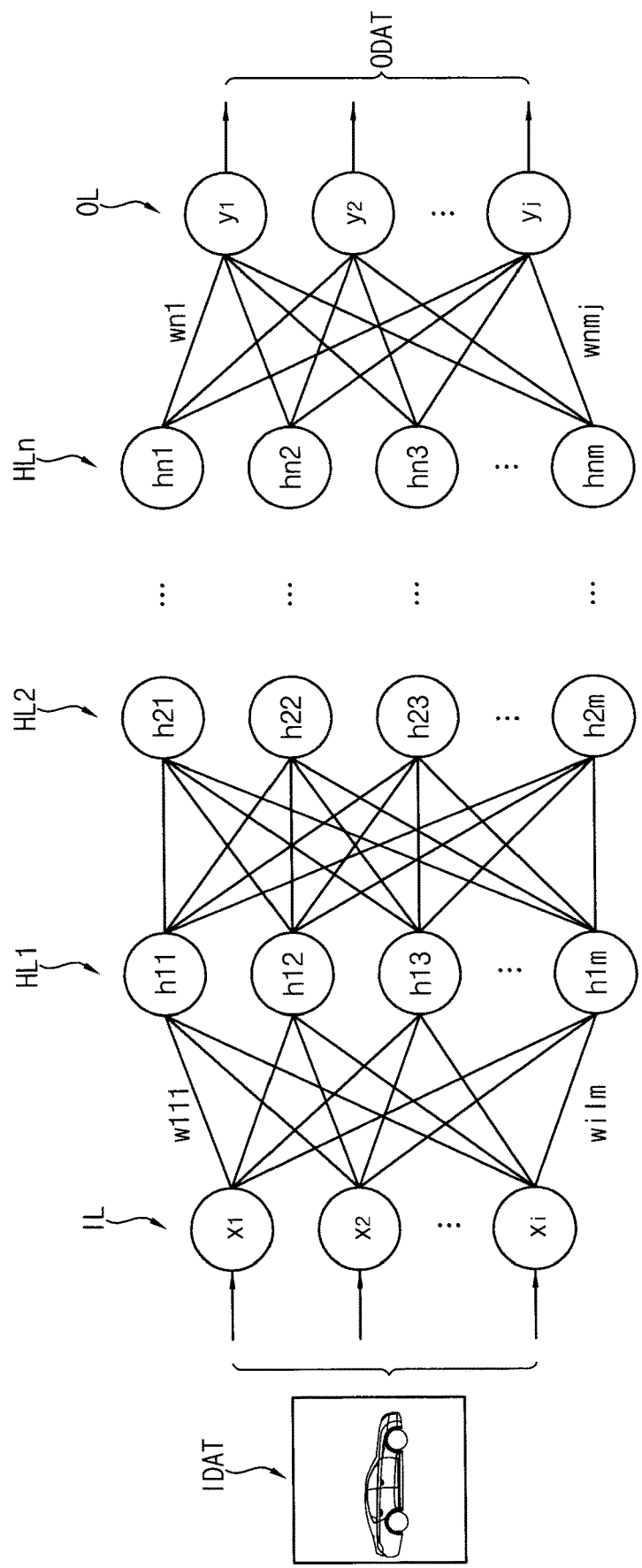
FIGS. 3 and 4 are diagrams for describing examples of a deep learning neural network structure that is driven by a neural network device, according to embodiments.
Figure 4:
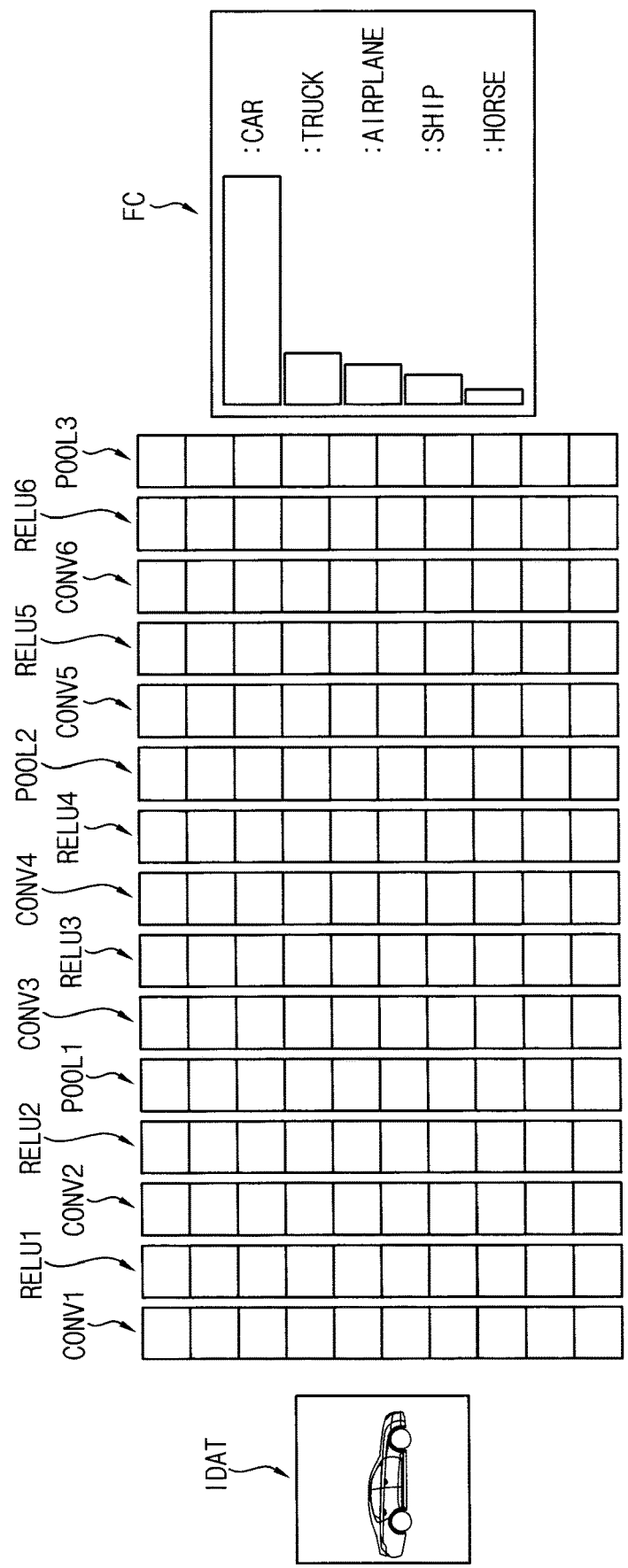

FIGS. 3 and 4 are diagrams for describing examples of a deep learning neural network structure that is driven by a neural network device, according to embodiments.

Referring to FIG. 3, a general neural network may include an input layer IL, a plurality of hidden layers HL1, HL2, . . . , HLn and an output layer OL.

The input layer IL may include i input nodes x1, x2, . . . , xi, where i is a natural number. Input data (e.g., vector input data) IDAT whose length is i may be input to the input nodes x1, x2, . . . , xi such that each element of the input data IDAT is input to a respective one of the input nodes x1, x2, . . . , xi.

The plurality of hidden layers HL1, HL2, . . . , HLn may include n hidden layers, where n is a natural number, and may include a plurality of hidden nodes $h^1_1$, $h^1_2$, $h^1_3$, . . . , $h^1_m$, $h^2_1$, $h^2_2$, $h^2_3$, . . . , $h^2_m$, $h''_1$, $h''_2$, $h''_3$, . . . , $h''_m$. For example, the hidden layer HL1 may include m hidden nodes $h^1_1$, $h^1_2$, $h^1_3$, . . . , $h^1_m$, the hidden layer HL2 may include m hidden nodes $h^2_1$, $h^2_2$, $h^2_3$, . . . , $h^2_m$, and the hidden layer HLn may include m hidden nodes $h''_1$, $h''_2$, $h''_3$, . . . , $h''_m$, where m is a natural number.

The output layer OL may include j output nodes $y_1$, $y_2$, . . . , $y_j$, where j is a natural number. Each of the output nodes $y_1$, $y_2$, . . . , $y_j$ may correspond to a respective one of classes to be categorized. The output layer OL may output the output values (e.g., class scores or simply scores) associated with the input data IDAT for each of the classes. The output layer OL may be referred to as a fully-connected layer and may indicate, for example, a probability that the input data IDAT corresponds to a car.

A structure of the neural network illustrated in FIG. 3A may be represented by information on branches (or connections) between nodes illustrated as lines, and a weighted value assigned to each branch. Nodes within one layer may not be connected to one another, but nodes of different layers may be fully or partially connected to one another.

Each node (e.g., the node $h^1_1$) may receive an output of a previous node (e.g., the node $x_1$), may perform a computing operation, computation or calculation on the received output, and may output a result of the computing operation, computation or calculation as an output to a next node (e.g., the node $h^2_1$). Each node may calculate a value to be output by applying the input to a function, e.g., a nonlinear function.

Generally, the structure of the neural network is set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 3A may not be suitable for handling input image data (or input sound data) because each node (e.g., the node $h^1_1$) is connected to all nodes of a previous layer (e.g., the nodes $x_1$, $x_2$, . . . , $x_i$ included in the layer IL) and then the number of weighted values drastically increases as the size of the input image data increases. Thus, a convolutional neural network, which is implemented by combining the filtering technique with the general neural network, has been researched such that two-dimensional image (e.g., the input image data) is efficiently trained by the convolutional neural network.

Referring to FIG. 4, a convolutional neural network may include a plurality of layers CONV1, RELU1, CONV2, RELU2, POOL1, CONV3, RELU3, CONV4, RELU4, POOL2, CONV5, RELU5, CONV6, RELU6, POOL3 and FC.

Unlike the general neural network, each layer of the convolutional neural network may have three dimensions of width, height and depth, and thus data that is input to each layer may be volume data having three dimensions of width, height and depth. For example, if an input image in FIG. 3B has a size of 32 widths (e.g., 32 pixels) and 32 heights and three color channels R, G and B, input data IDAT corresponding to the input image may have a size of 32*32*3. The input data IDAT in FIG. 3B may be referred to as input volume data or input activation volume.

Each of convolutional layers CONV1, CONV2, CONV3, CONV4, CONV5 and CONV6 may perform a convolutional operation on input volume data. In an image processing, the convolutional operation represents an operation in which image data is processed based on a mask with weighted values and an output value is obtained by multiplying input values by the weighted values and adding up the total multiplied values. The mask may be referred to as a filter, window or kernel.

Parameters of each convolutional layer may consist of a set of learnable filters. Every filter may be small spatially (along width and height), but may extend through the full depth of an input volume. For example, during the forward pass, each filter may be slid (more precisely, convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32*32*3 passes through the convolutional layer CONV1 having four filters with zero-padding, output volume data of the convolutional layer CONV1 may have a size of 32*32*12 (e.g., a depth of volume data increases).

Each of RELU layers RELU1, RELU2, RELU3, RELU4, RELU5 and RELU6 may perform a rectified linear unit operation that corresponds to an activation function defined by, e.g., a function f(x)=max(0, x) (e.g., an output is zero for all negative input x). For example, if input volume data having a size of 32*32*12 passes through the RELU layer RELU1 to perform the rectified linear unit operation, output volume data of the RELU layer RELU1 may have a size of 32*32*12 (e.g., a size of volume data is maintained).

Each of pooling layers POOL1, POOL2 and POOL3 may perform a down-sampling operation on input volume data along spatial dimensions of width and height. For example, four input values arranged in a 2*2 matrix formation may be converted into one output value based on a 2*2 filter. For example, a maximum value of four input values arranged in a 2*2 matrix formation may be selected based on 2*2 maximum pooling, or an average value of four input values arranged in a 2*2 matrix formation may be obtained based on 2*2 average pooling. For example, if input volume data having a size of 32*32*12 passes through the pooling layer POOL1 having a 2*2 filter, output volume data of the pooling layer POOL1 may have a size of 16*16*12 (e.g., width and height of volume data decreases, and a depth of volume data is maintained).

One convolutional layer (e.g., CONV1) and one RELU layer (e.g., RELU1) may form a pair of CONV/RELU layers in the convolutional neural network, pairs of the CONV/RELU layers may be repeatedly arranged in the convolutional neural network, and the pooling layer may be periodically inserted in the convolutional neural network, thereby reducing a spatial size of image and extracting a characteristic of image.

An output layer or a fully-connected layer FC may output results (e.g., class scores) of the input volume data IDAT for each of the classes. For example, the input volume data IDAT corresponding to the two-dimensional image may be converted into an one-dimensional matrix or vector as the convolutional operation and the down-sampling operation are repeated. For example, the fully-connected layer FC may represent probabilities that the input volume data IDAT corresponds to a car, a truck, an airplane, a ship and a horse.

The types and number of layers included in the convolutional neural network may not be limited to an example described with reference to FIG. 3B and may be changed. In addition, the convolutional neural network may further include other layers such as a softmax layer for converting score values corresponding to predicted results into probability values, a bias adding layer for adding at least one bias, or the like.

As such, the deep learning neural network may include a plurality of layers, and the fixed-point format may be determined independently with respect to each of the plurality of layers. The nodes in each layer may perform the quantization based on the same fixed-point format. When the ANN includes a plurality of layers, the virtual overflow detection circuit 140 may generate a plurality of virtual overflow information corresponding to the plurality of layers, respectively, and the quantization parameter calculator 130 may determine the (k+1)-th fixed-point format for the next quantization with respect to each of the plurality of layers based on the plurality of virtual overflow information.

Figure 5A:
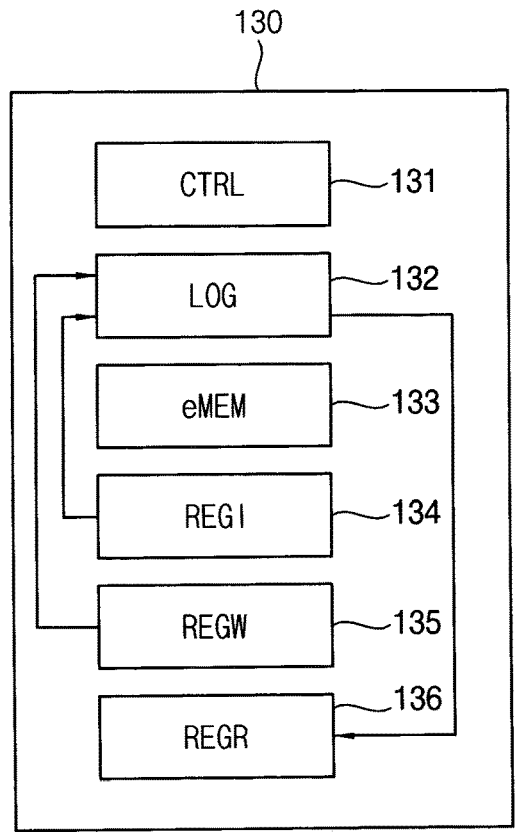
FIG. 5A is a block diagram illustrating an example of a quantization parameter calculator in FIG. 2, according to embodiments.

FIG. 5A is a block diagram illustrating an example of a quantization parameter calculator in FIG. 2, according to embodiments.

Referring to FIG. 5A, the quantization parameter calculator 130 may include a control circuit CTRL 131, a logic circuit LOG 132, an embedded memory eMEM 133, an input register REGI 134, a weight register REGW 135 and a result register REGR 136.

The control circuit 131 controls overall operations of the quantization parameter calculator 130. The control circuit 131 may control flows of instructions and data for quantizing parameters of the neural network.

The embedded memory 133 may store the instructions and the data of the quantization parameter calculator 130. Input data and weight values to be quantized may be stored in the input register 134 and the weight register 135, respectively.

The logic circuit 132 may analyze a statistical distribution of M-bit floating-point type of parameter values associated with at least one layer of the neural network from data of a pre-trained floating-point neural network, may determine a quantization level of each of the parameters statistically covering a distribution range of the floating-point parameter values based on the statistical distribution and quantize the M-bit floating-point type of input data and weights into N-bit fixed-point type of asymmetric input data and N-bit floating-point type of weights, respectively, using quantization parameters generated based on the quantization level, based on the input data and the weights stored in the input register 134 and the weight register 135.

The logic circuit 132 may store quantization parameters in the input register 134 and the weight register 135 and may store the quantized N-bit fixed-point type of asymmetric input data and the quantized N-bit floating-point type of weights in the result register 136. The logic circuit 132 may be connected to the input register 134 and the weight register 135 and may be also connected to the result register 136.

The control circuit 131 may control the result register 136 to provide the quantized N-bit fixed-point type of asymmetric input data and the quantized N-bit floating-point type of weights to one of the processors 110.

The input register 134 and the weight register 135 may be implemented with a memory that has operating speed faster than the embedded memory 133, and the input data and the weights may be loaded to the input register 134 and the weight register 135 from the embedded memory 133.

Figure 5B:
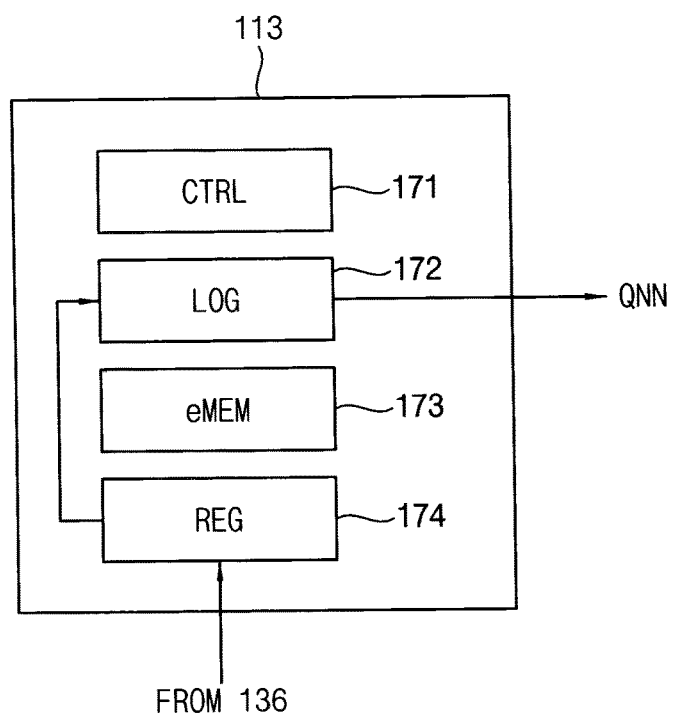
FIG. 5B is a block diagram illustrating one of processors in FIG. 2, according to embodiments.

FIG. 5B is a block diagram illustrating one of processors in FIG. 2, according to embodiments.

FIG. 5B illustrates an example of the neural processing unit 113 and other processors may have a similar or same configuration of the neural processing unit 113.

Referring to FIG. 5B, the neural processing unit (or, a processor) 113 may include a control circuit 171, a logic circuit 172, an embedded memory 173 and a register 174.

The control circuit 171 controls overall operations of the processor 113. The control circuit 171 may control flows of instructions and data for quantizing parameters of the neural network.

The embedded memory 173 may store the instructions and the data of the processor 113. The register 174 may store the quantized N-bit fixed-point type of asymmetric input data and the quantized N-bit floating-point type of weights provided from the result register 136.

The logic circuit 172 may be connected to the register 174 and may apply the quantized N-bit fixed-point type of asymmetric input data and the quantized N-bit floating-point type of weights to the neural network to generate a quantized neural network QNN.

Figure 6:
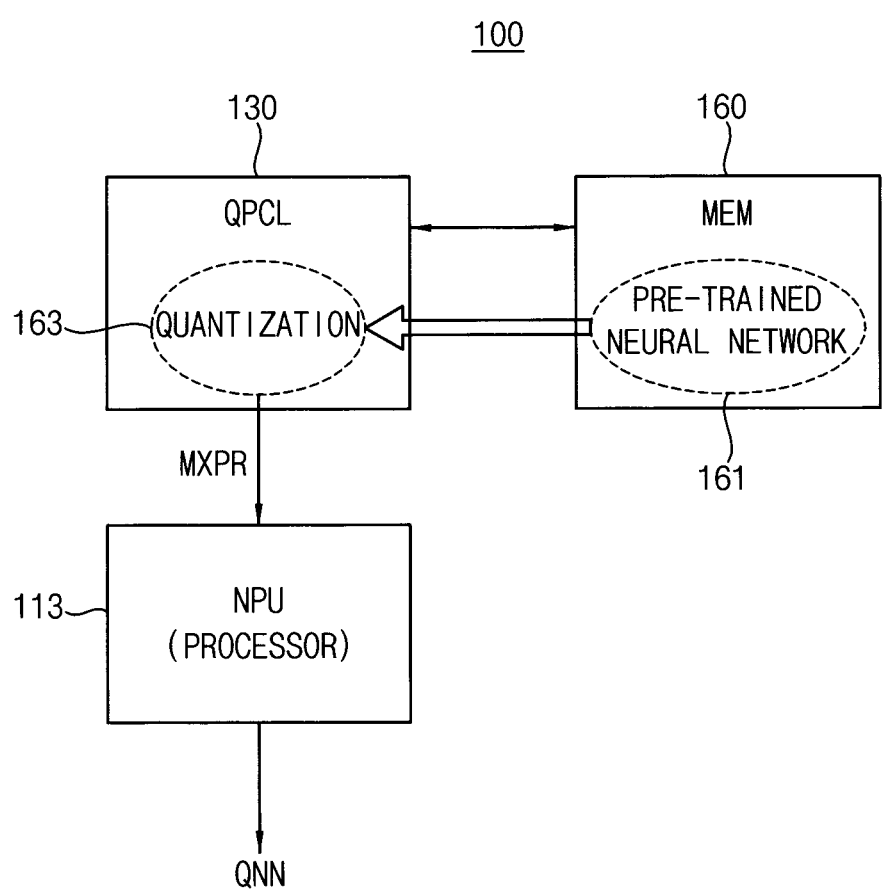
FIG. 6 is a block diagram of a hardware configuration of a neural network device according to embodiments.

FIG. 6 is a block diagram of a hardware configuration of a neural network device according to embodiments.

Referring to FIG. 6, the neural network device 100 may include the processor 113, the quantization parameter calculator 130 and the memory 160.

The neural network device 100 may correspond to a computing device having various processing functions such as generating a neural network, training (or learning) a neural network, quantizing a floating-point type neural network into a mixed-data type neural network, which includes fixed-point type data and floating-point type, or retraining a neural network.

The processor 113 may repeatedly train (learn) a given initial neural network to generate a pre-trained neural network 161. The initial neural network may have parameters of a floating-point type, for example, parameters of 32-bit floating-point precision, to secure processing accuracy of the neural network. The floating-point type parameters may include, for example, various types of data that are input/output to/from a neural network, such as input/output activations, weights, and biases of a neural network. As the repetitive training of the neural network progresses, the floating-point type parameters of the neural network may be tuned to compute a more accurate output for a given input.

A floating point may use a relatively large amount of computations and a high memory access frequency compared to a fixed point. Therefore, in a mobile device such as a smart phone, a tablet PC, a wearable device or the like and an embedded device having relatively low processing performance, the processing of a neural network having floating-point type parameters may not be smooth. Thus, to drive a neural network with acceptable accuracy loss while sufficiently reducing the amount of computations in such devices, the floating-point type parameters that are processed in the neural network may be quantized.

The neural network device 100 may perform quantization 163 to convert parameters of a trained neural network into predetermined bits of a fixed-point type and a floating-point type taking into consideration the processing performance of a device (e.g., a mobile device, an embedded device, etc.) in which a neural network is to be deployed. In addition, the neural network device 100 may transmit the quantized neural network QNN to the device to be deployed. The device in which a neural network is to be deployed may be, for example, an autonomous vehicle that performs speech recognition and image recognition using a neural network, a robot, a smart phone, a tablet device, an augmented reality (AR) device, an Internet of Things (IOT) device, or the like.

The quantization parameter calculator 130 may obtain data of the pre-trained neural network 161, using floating points stored in the memory 160. The pre-trained neural network data may be data repeatedly trained with floating-point type parameters. Neural network training may be repeatedly performed by receiving training set data as an input, and then repeatedly performed with test set data again, but is not limited thereto. The training set data is input data for training a neural network, and the test set data is input data that does not overlap the training set data and may train the neural network trained with the training set data while measuring performance thereof.

The quantization parameter calculator 130 may analyze a statistical distribution of M-bit floating-point type of parameter values associated with at least one layer of the neural network from data of the pre-trained neural network 161. The quantization parameter calculator 130 may analyze the statistical distribution by obtaining statistics for each channel of floating-point parameter values of weights, input activations, and output activations used in each layer during the pre-training of the neural network.

The quantization parameter calculator 130 may determine a quantization level of each of the parameters statistically covering a distribution range of the floating-point parameter values based on the statistical distribution, and quantize the M-bit floating-point type of input data and weights into N-bit fixed-point type of asymmetric input data and N-bit floating-point type of weights (163), respectively, using quantization parameters generated based on the quantization level. The quantization parameter calculator 130 may provide the processor 113 with the mixed-type parameters MXPR including the quantized N-bit fixed-point type of asymmetric input data and the quantized N-bit floating-point type of weights.

The processor 113 may apply the quantized N-bit fixed-point type of asymmetric input data and the quantized N-bit floating-point type of weights to the pre-trained neural network 161 to generate the quantized neural network QNN.

The memory 160 may store neural network-related data sets that have been processed or are to be processed by the processor 113 and/or the quantization parameter calculator 130, for example, data of an untrained initial neural network, data of a neural network generated in a training process, data of a neural network for which training has been completed, and data of a quantized neural network. In addition, the memory 160 may store various programs related to training algorithms and quantization algorithms of a neural network to be executed by the processor 113 and/or the quantization parameter calculator 130.

Figure 7:
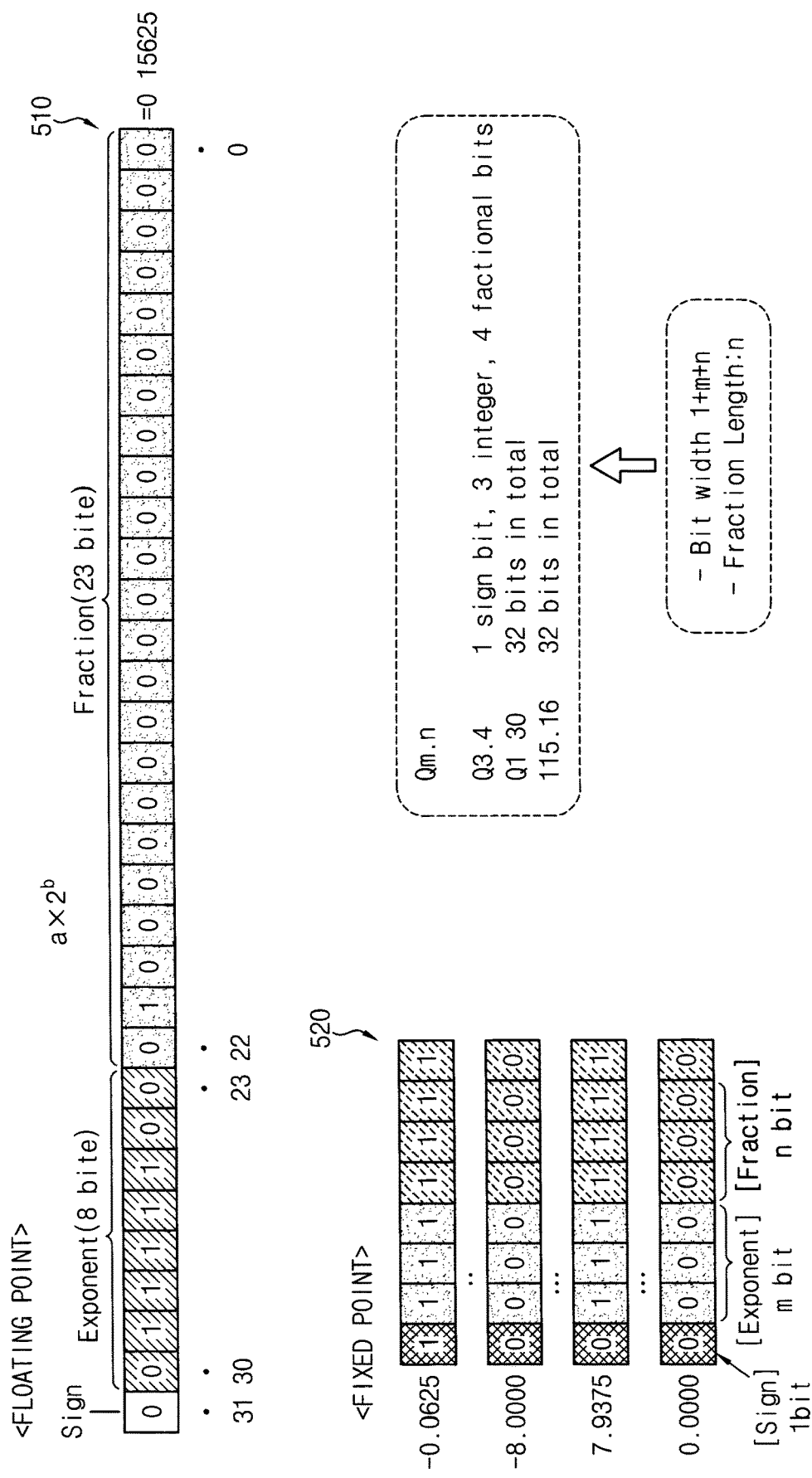
FIG. 7 is a diagram illustrating examples of a floating-point value and fixed-point values.

FIG. 7 is a diagram illustrating examples of a floating-point value and fixed-point values.

Referring to FIG. 7, a floating-point value 510 is expressed as "a×2$^b$", in which "a" is a fractional part and "b" is an exponent part. The floating-point value 510 is expressed by 32 bits including a 1-bit sign part, an 8-bit exponent part, and a 23-bit fractional part.

Furthermore, fixed-point values 520 are expressed by "Qm.n", where m and n are natural numbers. In the expression "Qm.n", "m" denotes the number of bits indicating the exponent part, and "n" denotes the number of bits indicating the fractional part. Accordingly, a bit width of a fixed-point value is (1+m+n) obtained by summing a 1-bit sign part, an m-bit exponent part, and an n-bit fractional part. Because bits of the fixed-point bits indicating the fractional part are n bits, a fractional length is n. For example, "Q3.4" is a total 8-bit fixed-point value including a 1-bit sign part, a 3-bit exponent part, and a 4-bit fractional part, "Q1.30" is a total 32-bit fixed-point value including a 1-bit sign part, a 1-bit exponent part, and a 30-bit fractional part, and "Q15.16" is a total 32-bit fixed-point value including a 1-bit sign part, a 15-bit exponent part, and a 16-bit fractional part.

FIG. 8 is a diagram illustrating an example of a relationship between a fractional length and an accuracy of a fixed-point value.

Referring to FIG. 8, assuming that the total bit width allotted to a fixed-point value is 3 bits, a fixed-point expression 530 of Q2.0 in which the fractional length is 0 and a fixed-point expression 540 of Q1.1 in which the fractional length is 1 are compared to each other.

For Q2.0, because the exponent part is 2 bits and the fractional part is 0 bits, fixed-point values from −4 to 3 may be expressed, and an interval between the possible fixed-point values is 1. For Q1.1, because the exponent part is 1 bit and the fractional part is 1 bit, fixed-point values from −2 to 1.5 may be expressed, and an interval between the possible fixed-point values is 0.5.

As can be seen from the comparison, although 3 bits are allotted to both the fixed-point expression 530 of Q2.0 and the fixed-point expression 540 of Q1.1, Q2.0 is able to express a wider range of fixed-point values than Q1.1, but has a lower accuracy because the interval between the fixed-point values is wider. On the other hand, Q1.1 is able to express a narrower range of fixed-point values than Q2.0, but has a higher accuracy because the interval between the fixed-point values is narrower. Consequently, it may be seen that the accuracy of a fixed-point value depends on the fractional length of the fixed-point value, that is, the number of fractional bits allotted to the fixed-point value.

The neural network device 100 may increase accuracy and dynamic range because the neural network device 100 quantizes M-bit floating-point type of input data into N-bit fixed-point type of input data and the quantized fixed-point type of input data is asymmetric.

Figure 9:
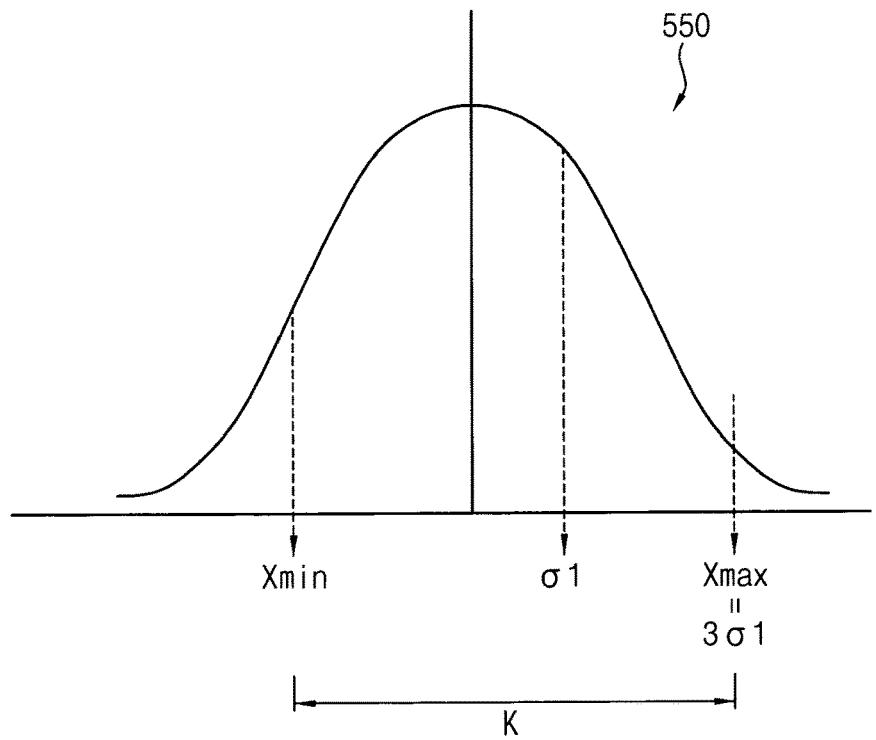
FIG. 9 is a graph showing an example of a statistical distribution of parameters used in a layer.

FIG. 9 is a graph showing an example of a statistical distribution of parameters used in a layer.

Referring to FIG. 9, after the repeated training of a neural network having floating-point parameters, a distribution of intrinsic floating-point values, that is, parameter values, is generated for a layer. The quantization parameter calculator 130 of FIG. 5A analyzes, from pre-trained neural network data, a statistical distribution for at least one layer based on statistics of floating-point parameter values for each channel. In detail, the quantization parameter calculator 130 obtains, from the pre-trained neural network data, statistics for floating-point parameter values of weights, input activations, and output activations, and normalizes the statistics for a layer with a probability density function (PDF) of a normal (Gaussian) distribution 550. However, although FIG. 9 illustrates an example in which, for convenience of explanation, the quantization parameter calculator 130 normalizes the statistics with the PDF of the normal distribution 550, the quantization parameter calculator 130 is not limited thereto. In other words, the quantization parameter calculator 130 may analyze the statistics by using various types of statistical distributions or probability distributions other than the normal distribution 550. The normal distribution 550 of FIG. 9 may be a distribution of floating-point activation values in a layer or a distribution of floating-point weight values in a layer.

The quantization parameter calculator 130 may determine a quantization level based on the normal distribution 550 so that parameters of the layer are quantized to a point expression having a fractional length. In detail, the quantization parameter calculator 130 obtains a statistical maximum value Xmax and a statistical minimum value Xmin of parameters in the normal distribution 550, and determines a quantization level K capable of statistically covering floating-point values in a range between the statistical maximum value Xmax and the statistical minimum value Xmin.

The statistical maximum value Xmax and the statistical minimum value Xmin are values based on a range in which a quantization error is minimized. The statistical maximum value Xmax and the statistical minimum value Xmin may be defined in various ways. For example, the statistical maximum value Xmax and the statistical minimum value Xmin may be an actual maximum parameter value and an actual minimum parameter value of parameters in the normal distribution 550. Alternatively, the statistical maximum value Xmax and the statistical minimum value Xmin may be upper and lower limits obtained based on the mean, variance, or standard deviation σ1 of the normal distribution 550.

Figure 10:
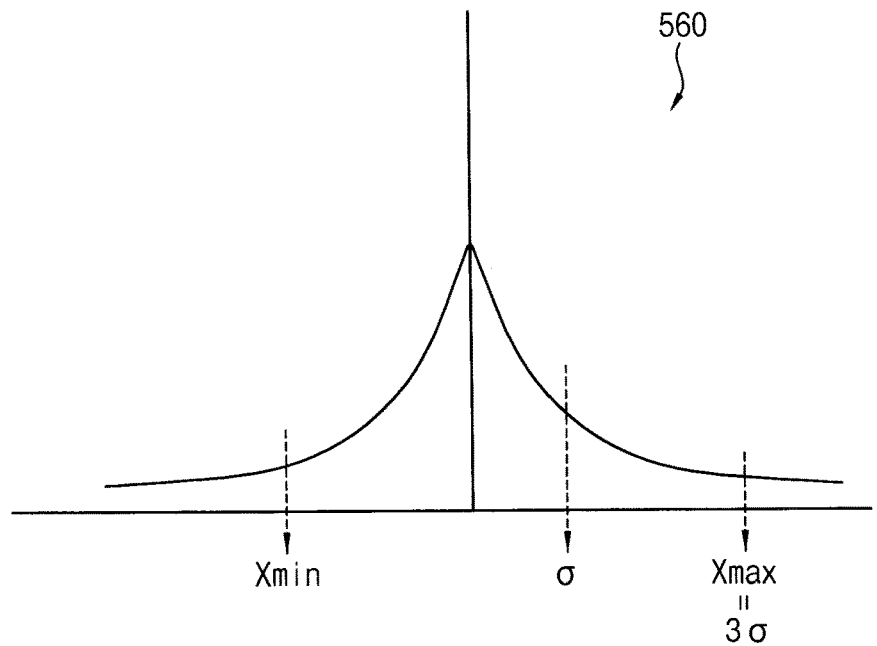
FIG. 10 is a graph showing another example of a statistical distribution of parameters used in a layer.

FIG. 10 is a graph showing another example of a statistical distribution of parameters used in a layer.

Referring to FIG. 10, instead of the normal distribution 550 of FIG. 9, the quantization parameter calculator 130 normalizes the statistics for each layer with the PDF of a Laplace distribution 560. The quantization parameter calculator 130, as described with reference to FIG. 9, determines a quantization level of parameters of a corresponding layer by obtaining the statistical maximum value Xmax and the statistical minimum value Xmin appropriate to the Laplace distribution 560.

Figure 11:
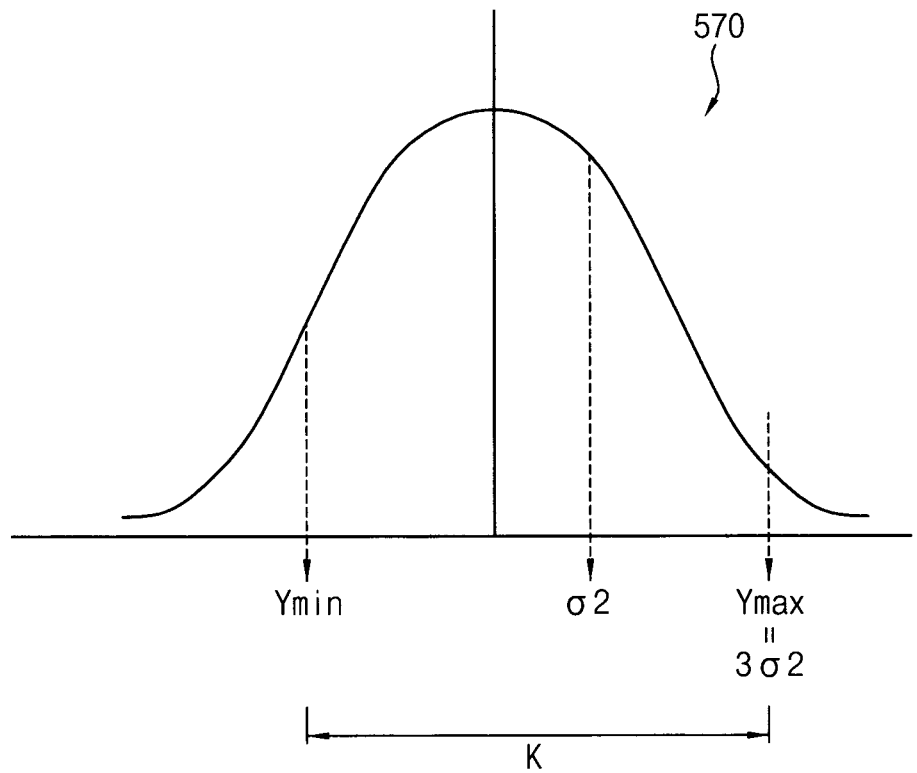
FIG. 11 is a graph showing another example of a statistical distribution of parameters used in a layer.

FIG. 11 is a graph showing another example of a statistical distribution of parameters used in a layer.

Referring to FIG. 11, the quantization parameter calculator 130 normalizes the statistics for each layer with the PDF of a normal distribution 570. The quantization parameter calculator 130, as described with reference to FIG. 9, determines a quantization level of parameters of a corresponding layer by obtaining a statistical maximum value Ymax and a statistical minimum value Ymin appropriate to the normal distribution 570. The statistical maximum value Ymax and the statistical minimum value Ymin may be upper and lower limits obtained based on the mean, variance, or standard deviation σ2 of the normal distribution 570.

Figure 12:
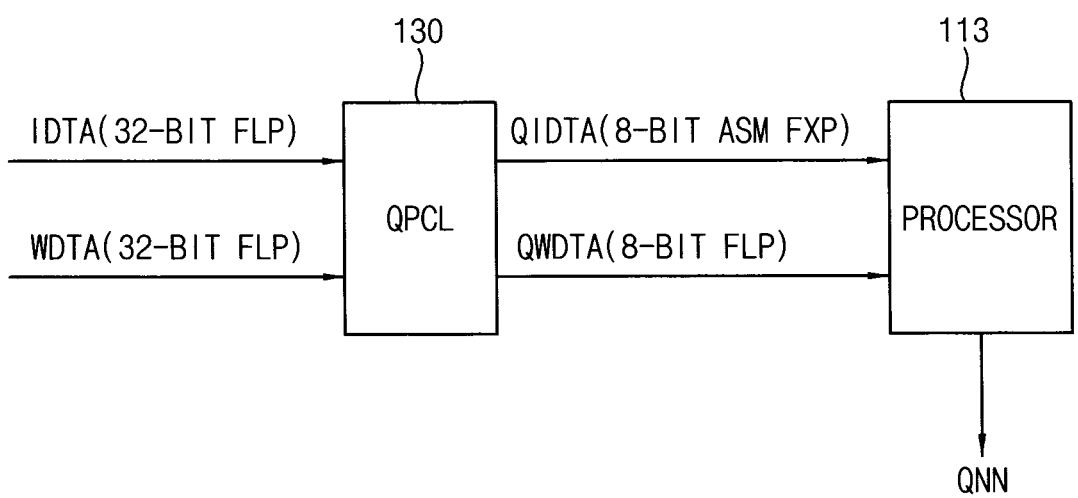
FIG. 12 is a diagram illustrating that the neural network device of FIG. 2 quantizes input data and weights, according to embodiments.

FIG. 12 is a diagram illustrating that the neural network device of FIG. 2 quantizes input data and weights, according to embodiments.

In FIG. 12, it is assumed that M is 32 and N is 8.

Referring to FIG. 12, the quantization parameter calculator 130 may quantize M-bit floating-point type 32-BIT floating point (FLP) of input data IDTA and weights WDTA into N-bit fixed-point type 8-BIT asymmetric (ASM) fixed point (FXP) of asymmetric input data QIDTA and N-bit floating-point type 8-BIT FLP of weights QWDTA, respectively. The processor 113 may apply the quantized N-bit fixed-point type 8-BIT ASM FXP of asymmetric input data QIDTA and the quantized N-bit floating-point type 8-BIT FLP of weights QWDTA to the neural network to generate the quantized neural network QNN.

FIG. 13A illustrates quantized input data provided from a quantization parameter calculator.

Referring to FIG. 13A, the quantization parameter calculator 130 may quantize the M-bit floating-point type of input data IDTA into the N-bit fixed-point type of asymmetric input data QIDTA. The M-bit floating-point type of input data IDTA may be represented as e×2f and the N-bit fixed-point type of asymmetric input data QIDTA may be represented as Qm.n.

A sum of a fractional part e and an exponent part f of the M-bit floating-point type of input data IDTA corresponds to M−1 and m+n of the N-bit fixed-point type of asymmetric input data QIDTA corresponds to N−1. Although, it is assumed that M is 32 and N is 8, values of M and M are not limited thereto. The quantized input data QIDTA is asymmetric because the statistical maximum value Xmax and the statistical minimum value Xmin are asymmetric with respect to each other in FIG. 9. When the quantized input data QIDTA is represented asymmetrically, the input data IDTA may be more accurately represented and the accuracy may be enhanced.

FIG. 13B illustrates quantized weights provided from a quantization parameter calculator.

Referring to FIG. 13B, quantized weights Wnew may include a fractional part a' and an exponent part b' and may further include an exponent bias bse.

When the quantization parameter calculator 130 quantizes the M-bit floating-point type of weights into the N-bit floating-point type of weights, a sum of a number of bits in the fractional part a' and a number of bits in the exponent part b' corresponds to N−1.

Because the quantized weights Wnew includes the exponent bias bse, the weights WDAT may be represented with highly dynamic range.

The exponent bias bse may be differently applied to negative weights and positive weights before the negative weights and the positive weights are quantized.

FIG. 14 is a flowchart illustrating an operation of quantizing input data and weights in FIG. 1, according to embodiments.

Referring to FIGS. 5A, and 6 through 14, for quantizing input data and weights (operation S300 of FIG. 5A), in operation S310, the quantization parameter calculator 130 may determine a first step size, a second step size, a first zero point and a second zero point based on the quantization level, a maximum value the statistical distribution and a minimum value of the statistical distribution. The first step size is associated with the input data and corresponds to a gap between the quantization level, the second step size corresponds to a gap between a quantization level of an output data obtained by performing node operation of the input data and the weights, the first zero point indicates a zero value of the input data and the second zero point indicates a zero value of the output data.

In operation S320, the quantization parameter calculator 130 may determine a new weight based on the first step size and the second step size. In operation S330, the quantization parameter calculator 130 may determine a bias associated with the output data based on the new weight.

The quantization parameter calculator 130 determines the first step size $\Delta x$, which is associated with associated with the input data x and corresponds to a gap between the quantization level based on the statistical maximum value Xmax and the statistical minimum value Xmin by $$\Delta x = \frac{X_{max} - X_{min}}{K}.$$

Here, K corresponds to the quantization level.

The input data x may be quantized by a following Expression 1.

$$x = \Delta x (q_x - z_x),\quad \text{[Expression 1]}$$

Here, $q_x$ denotes quantized input data, $z_x$ denotes the first zero point.

The quantization parameter calculator 130 determines the second step size $\Delta y$ using a maximum value Ymax of an output data y and a minimum value of the output data y by $$\Delta y = \frac{Y_{max} - Y_{min}}{K}$$

for analyzing statistics for a next layer.

The output data y may be quantized by a following Expression 2.

$$y = \Delta y (a_y - z_y) = \Sigma_{c,k}\{w_{c,k} x_{c,k}\} + \text{bias} \quad \text{[Expression 2]}$$

Here, c denotes c-th layer, k denotes k-th node in the c-th layer and bias denotes a bias associated with the node.

The quantization parameter calculator 130 generates a new weight Wnew based on the first step size $\Delta x$ and the second step size $\Delta y$ by a following Expression 3.

$$q_y = \Sigma_{c,k}\left\{w_{c,k} \times \frac{\Delta_x}{\Delta_y}(q_{x_{c,k}} - z_x)\right\} + \frac{\text{bias}}{\Delta_y} + z_y = \quad \text{[Expression 3]}$$

$$\Sigma_{c,k}\{w_{new_{c,k}}(q_{x_{c,k}} - z_x)\} + \frac{\text{bias}}{\Delta_y} + z_y =$$

$$\Sigma_{c,k}\{w_{new_{c,k}} q_{x_{c,k}}\} - \Sigma_{c,k}\{w_{new_{c,k}} z_x\} + \frac{\text{bias}}{\Delta_y} + z_y$$

Here, $-\dfrac{\Delta_y \Sigma_{c,k}\{w_{new_{c,k}} z_x\}}{\Delta_y} + \dfrac{\text{bias}}{\Delta_y} + z_y$ may be represented by a following Expression 4.

$$-\frac{\Delta_y \Sigma_{c,k}\{w_{new_{c,k}} z_x\}}{\Delta_y} + \frac{\text{bias}}{\Delta_y} + z_y = \quad \text{[Expression 4]}$$

$$\frac{1}{\Delta_y}[\text{bias} - \Delta_y \Sigma_{c,k}\{w_{new_{c,k}} z_x\}] + z_y$$

Here, if a new bias $\text{bias}_{new}$ is represented by $$\text{bias} - \Delta_y \Sigma_{c,k}\{w_{new_{c,k}} z_x\}, a$$

following Expression 5 is deduced and the quantization parameter calculator 130 generates a quantized bias $q_{bias_{new}}$.

$$\text{round}\left(\frac{1}{\Delta_y}[\text{bias}_{new}]\right) + z_y = q_{bias_{new}} \quad \text{[Expression 5]}$$

Here, round is a round off function to round off predetermined numbers. In Expression 5, a floor function instead of the round function may be used and the floor function is a function that takes as a input a real number and gives as an output the greatest integer less than or equal to the real number.

Therefore, the quantization parameter calculator 130 may generate the new bias $\text{bias}_{new}$ associated with the output data based on the bias, the new weights Wnew, the first zero point $z_x$ and the second step size $\Delta y$. In addition, a quantized output $q_y$ may be generated by a following Expression 6.

$$q_y = \sum_{c,k}\{w_{new_{c,k}} q_{x_{c,k}}\} + q_{bias_{new}} \quad \text{[Expression 6]}$$

If the new weights is quantized by Expression 7, Expression 6 is deduced into Expression 8.

$$q_w = -1 \text{sign} \times 2^{3bit\ exponent-bse} \times 4 \text{ bit mantissa with implicit bit} \quad \text{[Expression 7]}$$

Here, bse denotes exponent bias.

$$q_y = \sum_{c,k}\{q_{w_{new_{c,k}}} q_{x_{c,k}}\} + q_{bias_{new}} \quad \text{[Expression 8]}$$

The quantization parameter calculator 130 may stretch the weights before quantizing the weights for accomplishing higher accuracy. Stretching the weights is represented by a following Expression 9.

$$q_y = \sum_{c,k}\left\{\frac{S_w W_{new_{max}}}{S_w W_{new_{max}}} w_{new_{c,k}} q_{x_{c,k}}\right\} + \text{bias}_{new} = \quad \text{[Expression 9]}$$

$$\frac{W_{new_{max}}}{S_w}\Sigma_{c,k}\left\{\frac{S_w}{W_{new_{max}}} w_{new_{c,k}} q_{x_{c,k}}\right\} + \text{bias}_{new} =$$

$$\frac{W_{new_{max}}}{S_w}\Sigma_{c,k}\{w_{stretched_{c,k}} q_{x_{c,k}}\} + \text{bias}_{new} =$$

$$S_{w_{new}}\Sigma_{c,k}\{w_{stretched_{c,k}} q_{x_{c,k}}\} + \text{bias}_{new}$$

Here, $S_w$ corresponds to a multiple of two, which is greater than a maximum Wnewmax of the new weight Wnew and is nearest to the maximum Wnewmax and Wstretched corresponds to stretched weights. The quantization parameter calculator 130 generates the quantized N-bit floating-point type of weights by using a multiple of two, which is greater than a maximum of the quantized N-bit floating-point type of weights and which is nearest to the weights.

The quantization parameter calculator 130 may analyze a statistical distribution of parameter values for each of nodes included in the at least one layer and may quantize input data and weights for each of the nodes based on the statistical distribution.

Figure 15:
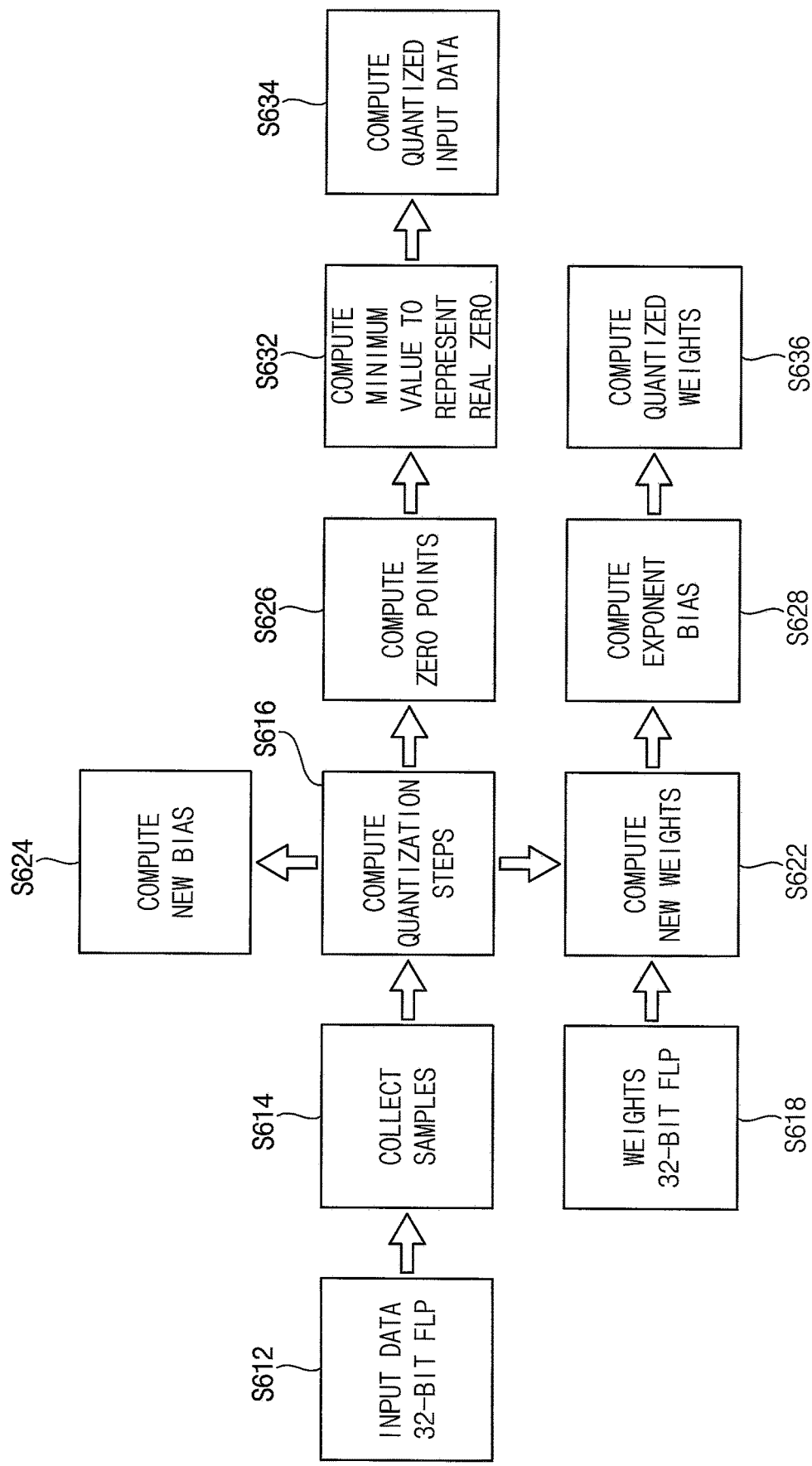
FIG. 15 is a diagram illustrating an example of quantization operation of a quantization parameter calculator, according to embodiments.

FIG. 15 is a diagram illustrating an example of quantization operation of a quantization parameter calculator, according to embodiments.

Referring to FIG. 15, the quantization parameter calculator 130 receives 32-bit floating-point type of input data in operation S612, collects samples from the input data in operation S614, and computes quantization steps based on statistical distribution of the collected samples in operation S616. The quantization parameter calculator 130 receives 32-bit floating-point type of weights in operation S618, computes new weights based on the quantization steps in operation S622, and computes a new bias in operation S624. The quantization parameter calculator 130 computes zero points based on the quantization steps in operation S626, computes a minimum value of a statistical distribution to represent a real zero point in operation S632, and computes quantized 8-bit fixed-point type of asymmetric input data in operation S634. The quantization parameter calculator 130 computes an exponent bias based on the new weights in operation S628, and computes quantized 8-bit floating-point type of weights in operation S636.

Figure 16:
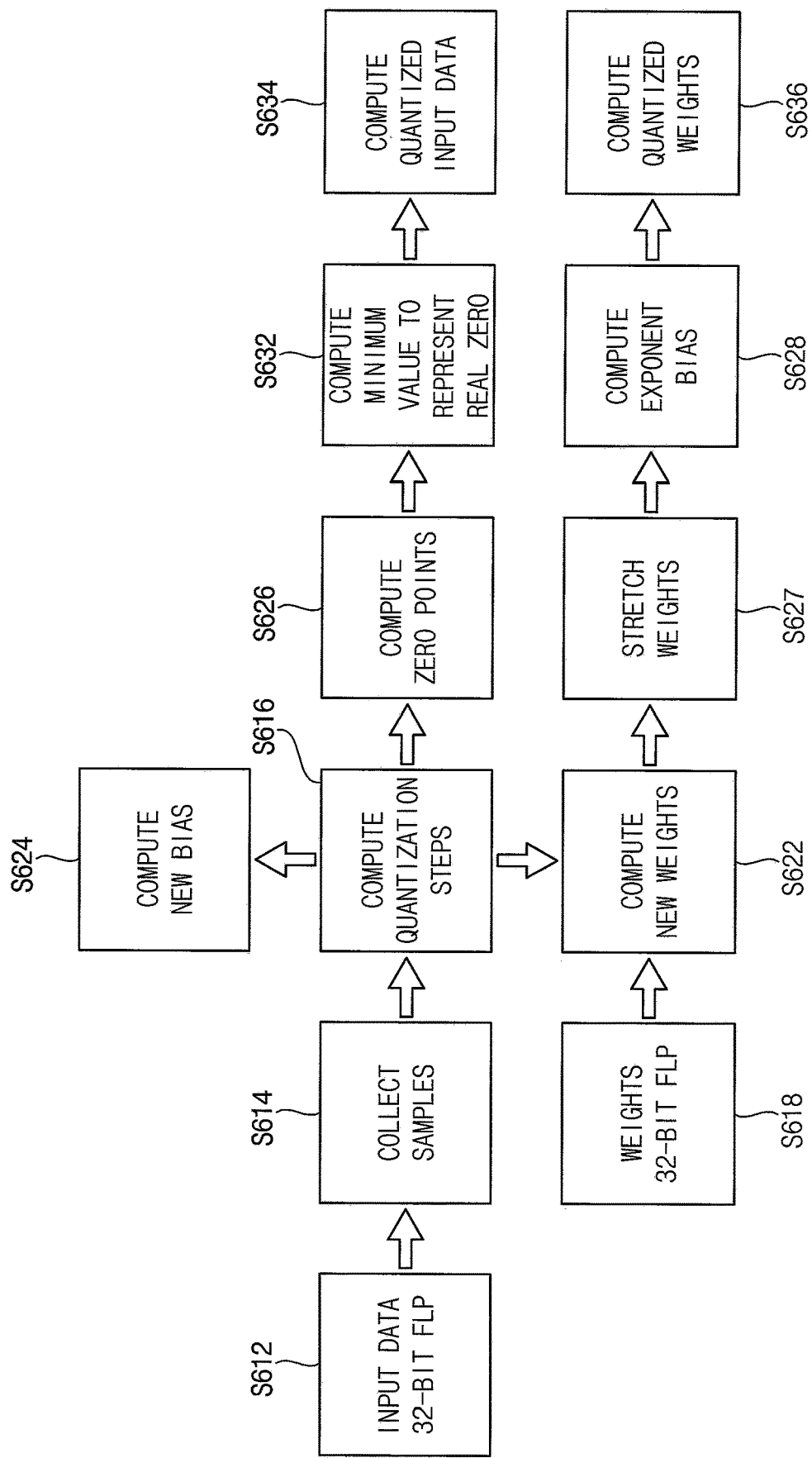
FIG. 16 is a diagram illustrating another example of quantization operation of a quantization parameter calculator, according to embodiments.

FIG. 16 is a diagram illustrating another example of quantization operation of a quantization parameter calculator, according to embodiments.

FIG. 16 differs from FIG. 15 in that operation S627 of stretching the weights is added between operations S622 and S628, and detailed description will be omitted.

Figure 17:
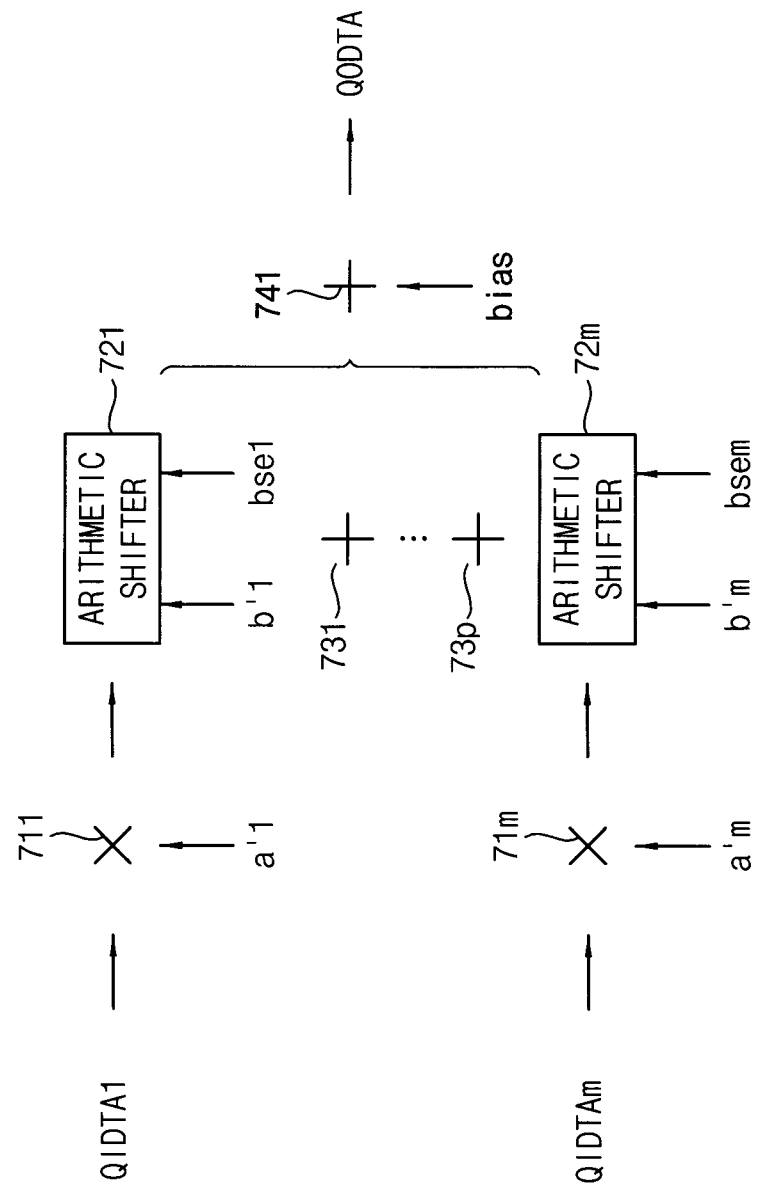
FIG. 17 is a diagram illustrating an example operation of a processor in the neural network device of FIG. 2, according to embodiments.

FIG. 17 is a diagram illustrating an example operation of a processor in the neural network device of FIG. 2, according to embodiments.

FIG. 17 illustrates an example operation of the processor 113 for one layer in the neural network device 100.

Referring to FIG. 17, one layer in the neural network device 100 may include a plurality of multipliers 711~71m (m is an integer greater than two), a plurality of arithmetic shifters 721~72m and a plurality of adders 731~73p and 741 (p is an integer greater than two).

The multiplier 711 performs multiplication on a quantized input data QIDTA1 and a fractional part a'1 of the quantized weights and provides a result of the multiplication to the arithmetic shifter 721. The arithmetic shifter 721 shifts an output of the multiplier 711 by a sum of the exponent part b'1 of the quantized weights and an exponent bias bse1 to output a shifted result. The multiplier 71m performs multiplication on a quantized input data QIDTAm and a fractional part a'm of the quantized weights and provides a result of the multiplication to the arithmetic shifter 72m. The arithmetic shifter 72m shifts an output of the multiplier 71m by a sum of the exponent part b'm of the quantized weights and an exponent bias bsem to output a shifted result. The adders 731~73p and 741 add outputs of the arithmetic shifters 721~72m and a bias to provide quantized output data QODTA. For increasing accuracy, the quantization parameter calculator 130 may quantize the bias into M-bit asymmetric fixed-point type.

Figure 18:
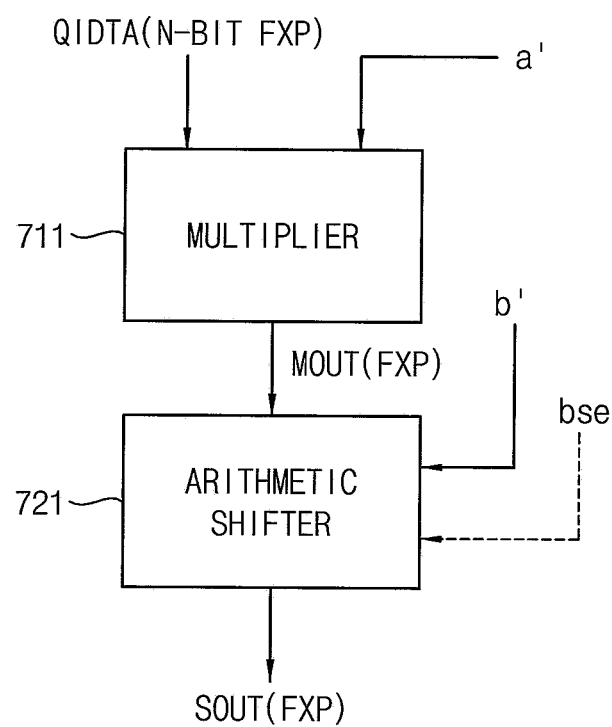
FIG. 18 is a block diagram illustrating a multiplier and an arithmetic shifter in the operation of the processor in FIG. 17.

FIG. 18 is a diagram illustrating a multiplier and an arithmetic shifter in the operation of the processor in FIG. 17.

Referring to FIG. 18, the multiplier 711 performs fixed-point multiplication on the quantized N-bit fixed-point type of input data QIDTA and a fractional part a' of the quantized N-bit floating-point type of weights to provide fixed-point type FXP of output MOUT. The arithmetic shifter 721 shifts the output MOUT of the multiplier 711 by a sum of the exponent part b' of the quantized N-bit floating-point type of weights to provide fixed-point type of output SOUT. The arithmetic shifter 721 further shifts the output MOUT of the multiplier 711 by an exponent bias bse of the weights.

Figure 19:
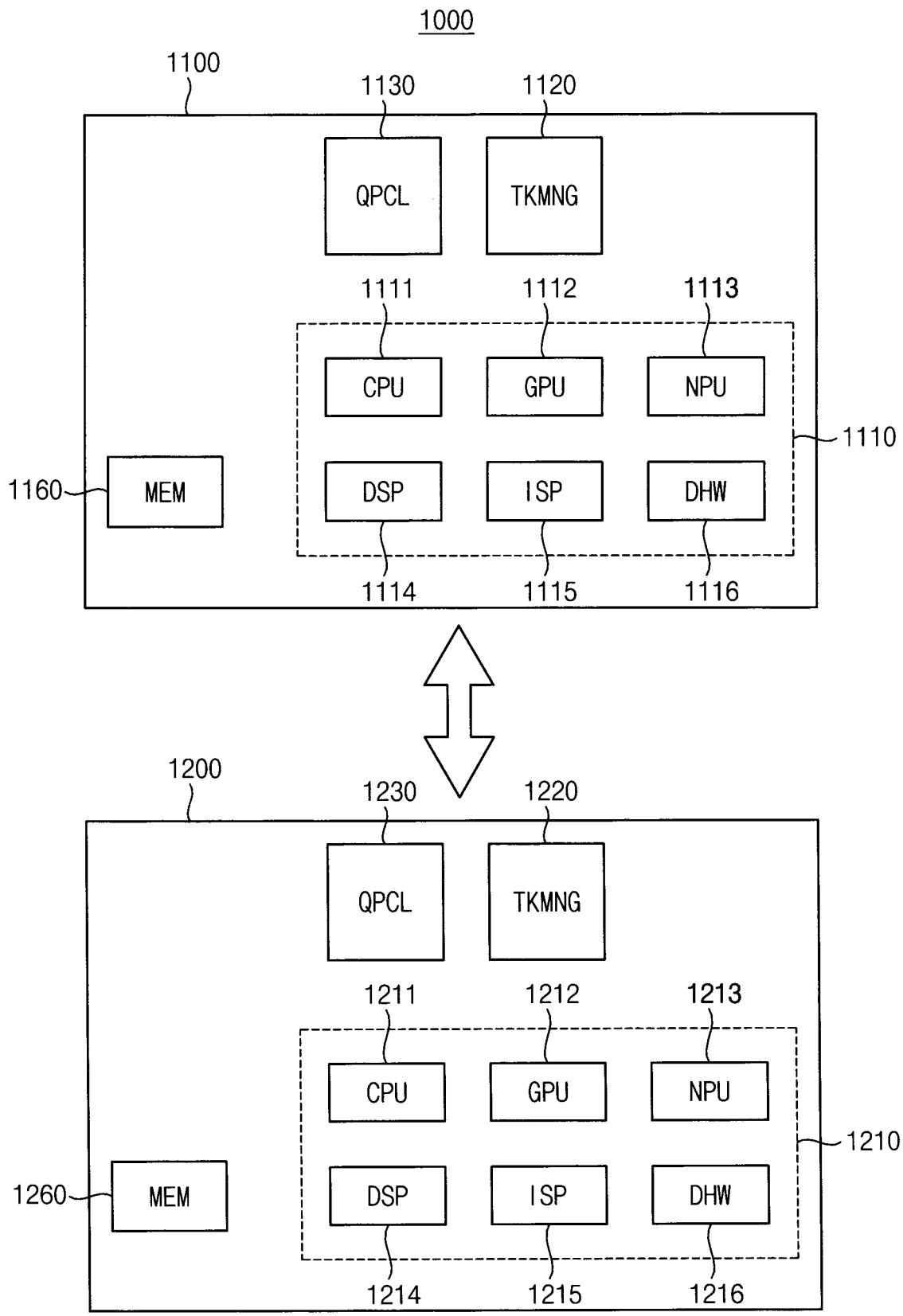
FIG. 19 is a block diagram illustrating a neural network system according to embodiments.

FIG. 19 is a block diagram illustrating a neural network system according to embodiments.

Referring to FIG. 19, an neural network system may include a first electronic device 1101 and a second electronic device 1201. The deep learning system may be driven by the first electronic device 1101 and the second electronic device 1201.

The first electronic device 1101 may include a plurality of heterogeneous processors 1110, a task manager TKMNG 1120, a quantization parameter calculator 1130, and a memory MEM 1160. The second electronic device 1201 may include a plurality of heterogeneous processors 1210, a task manager TKMNG 1220, a quantization parameter calculator QPCL 1230, and a memory MEM 1260. The pluralities of heterogeneous processors 1110 and 1210 may respectively include CPUs 1111 and 1211, GPUs 1112 and 1212, NPUs 1113 and 1213, DSPs 1114 and 1214, ISPs 1115 and 1215, and dedicated hardwares 1116 and 1216.

The pluralities of heterogeneous processors 1110 and 1210, the task managers 1120 and 1220, the quantization parameter calculator 1130 and 1230, and the memories 1160 and 1260 in FIG. 19 may be substantially the same as described with reference to FIGS. 1 through 18.

In examples, some of the heterogeneous processors (e.g., 1111, 1112, 1113, 1114, 1115 and 1116) may be included in the first electronic device 1101, and the other heterogeneous processors (e.g., 1211, 1212, 1213, 1214, 1215 and 1216) may be included in the second electronic device 1201. The first electronic device 1101 may be an electronic device that directly interacts with a user (e.g., directly controlled by a user). The second electronic device 1201 may be physically separated from the first electronic device 1101, and may be interoperable with the first electronic device 1101.

In examples, the first electronic device 1101 may be any computing device and/or mobile device, such as a personal computer (PC), a laptop computer, a mobile phone, a smart phone, a tablet computer, a personal digital assistants (PDA), a portable multimedia player (PMP), a digital camera, a camcorder, a music player, a video player, a portable game console, a navigation device, a wearable device, an internet of things (IOT) device, an internet of everythings (IoE) device, a virtual reality (VR) device, an augmented reality (AR) device, etc.

In examples, the second electronic device 1201 may be any computing device and/or mobile device that is interoperable with the first electronic device 1101. For example, the second electronic device 1201 may be a companion device that depends on the first electronic device 1101, such as a wearable device (e.g., a smart watch). Alternatively, the second electronic device 1201 may be an in-house server (e.g., a home gateway) that controls an IoT device and/or an IoE device, or an outside server (e.g., a cloud server).

The inventive concepts may be applied to various devices and systems that include the neural network and/or machine learning systems.

As is traditional in the field of the inventive concepts, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The foregoing is illustrative of the embodiments and is not to be construed as limiting thereof. Although the embodiments have been described, those skilled in the art will readily appreciate that many modifications are possible in the embodiments without materially departing from the inventive concepts.

What is claimed is:

1. A neural network device comprising:
   a quantization parameter calculator configured to quantize parameters of a neural network that is pre-trained, so that the quantized parameters are of mixed data types; and
   a processor configured to apply the quantized parameters to the neural network,
   wherein the quantization parameter calculator is further configured to:
      analyze a statistical distribution of parameter values of an M-bit floating-point type, the parameter values being associated with at least one layer of the neural network, M being a natural number greater than three;
      obtain a quantization level of each of the parameters statistically covering a distribution range of the parameter values, based on the analyzed statistical distribution; and
      quantize input data and weights of the M-bit floating-point type into asymmetric input data of an N-bit fixed-point type and weights of an N-bit floating-point type, using quantization parameters that are obtained based on the obtained quantization level of each of the parameters, N being a natural number greater than one and less than M,
   wherein the quantization parameter calculator is further configured to:
   obtain a first step size that corresponds to a first gap between the obtained quantization level of each of the parameters, by using a statistical maximum value and a statistical minimum value of the parameter values, and the obtained quantization level of each of the parameters, wherein the input data is quantized based on the obtained first step size and a first zero point, the first zero point indicating a zero value of the input data of the M-bit floating-point type;
   obtain a second step size that corresponds to a second gap between a quantization level of an output data that is obtained by performing a node operation of the input data and the weights of the M-bit floating-point type, wherein the output data is quantized based on the obtained second step size and a second zero point, the second zero point indicating a zero value of the output data;

obtain a new weight, based on the obtained first step size and the obtained second step size; and obtain a new bias based on a bias that is not quantized, the obtained new weight, the obtained first zero point and the obtained second step size, and wherein the processor is further configured to obtain the quantized output data by performing a node operation on the quantized input data and the new weight and adding the new bias.

2. The neural network device of claim 1, wherein the quantization parameter calculator is further configured to analyze the statistical distribution by obtaining statistics for the parameter values of the input data, the weights, and biases of the M-bit floating-point type, and wherein the processor is further configured to obtain a quantized neural network by applying, to the neural network, the asymmetric input data of the N-bit fixed-point type and the weights of the N-bit floating-point type.

3. The neural network device of claim 1, wherein the quantization parameter calculator is further configured to obtain the asymmetric input data of the N-bit fixed-point type by applying the obtained first step size and the obtained second step size to the input data of the M-bit floating-point type.

4. The neural network device of claim 1, wherein the quantization parameter calculator is further configured to obtain the asymmetric input data of the N-bit fixed-point type by applying the obtained first step size and the obtained second step size to the weights of the N-bit floating-point type.

5. The neural network device of claim 4, wherein the weights of the N-bit floating-point type comprise an exponent bias.

6. The neural network device of claim 5, wherein the quantization parameter calculator is further configured to apply the exponent bias to a plurality of layers included in the neural network differently.

7. The neural network device of claim 4, wherein the quantization parameter calculator is further configured to obtain the weights of the N-bit floating-point type, using a multiple of two that is greater than a maximum value of the weights of the N-bit floating-point type and nearest to the maximum value.

8. The neural network device of claim 1, wherein the quantization parameter calculator is further configured to:

analyze the statistical distribution of the parameter values for each of a plurality of nodes included in the at least one layer of the neural network; and quantize input data and weights associated with each of the plurality of nodes, based on the analyzed statistical distribution.

9. The neural network device of claim 1, wherein the quantization parameter calculator comprises:

a logic circuit configured to quantize the input data and the weights of the M-bit floating-point type into the asymmetric input data of the N-bit fixed-point type and the weights of the N-bit floating-point type, using the quantization parameters;

a control circuit configured to control the logic circuit;

an input register and a weight register configured to store the quantization parameters; and a result register configured to store the asymmetric input data of the N-bit fixed-point type and the weights of the N-bit floating-point type.

10. The neural network device of claim 1, wherein the processor comprises:

a register configured to receive, from the quantization parameter calculator, the asymmetric input data of the N-bit fixed-point type and the weights of the N-bit floating-point type, and store the asymmetric input data of the N-bit fixed-point type and the weights of the N-bit floating-point type;

a logic circuit configured to apply, to the neural network, the asymmetric input data of the N-bit fixed-point type and the weights of the N-bit floating-point type, to obtain a quantized neural network; and a control circuit configured to control the logic circuit.

11. The neural network device of claim 1, wherein the statistical distribution is approximated by a normal distribution or a Laplace distribution, and wherein the quantization parameter calculator is further configured to obtain the quantization level of each of the parameters, based on any one or any combination of a mean, a variance, a standard deviation, a maximum value, and a minimum value of the parameter values that are obtained from the analyzed statistical distribution.

12. The neural network device of claim 11, wherein the quantization parameter calculator is further configured to obtain the quantization level of each of the parameters, based on any one or any combination of the mean, the variance, the standard deviation, the maximum value, and the minimum value of the parameter values, to reduce a probability of a quantization error.

13. A neural network device comprising:

a quantization parameter calculator configured to quantize parameters of a neural network that are pre-trained, so that the quantized parameters are of mixed data types; and a processor configured to apply the quantized parameters to the neural network, wherein the quantization parameter calculator comprises:

a logic circuit configured to quantize input data and weights of an M-bit floating-point type into asymmetric input data of an N-bit fixed-point type and weights of an N-bit floating-point type, using quantization parameters;

a control circuit configured to control the logic circuit;

an input register and a weight register configured to store the quantization parameters; and a result register configured to store the asymmetric input data of the N-bit fixed-point type and the weights of the N-bit floating-point type, wherein the logic circuit is further configured to:

obtain a first step size that corresponds to a first gap between the obtained quantization level of each of the parameters, by using a statistical maximum value and a statistical minimum value of the parameter values, and the obtained quantization level of each of the parameters, wherein the input data is quantized based on the obtained first step size and a first zero point, the first zero point indicating a zero value of the input data of the M-bit floating-point type;

obtain a second step size that corresponds to a second gap between a quantization level of an output data that is obtained by performing a node operation of the input data and the weights of the M-bit floating-point type, wherein the output data is quantized based on the obtained second step size and a second zero point, the second zero point indicating a zero value of the output data;

obtain a new weight, based on the obtained first step size and the obtained second step size; and obtain a new bias based on a bias that is not quantized, the obtained new weight, the obtained first zero point and the obtained second step size, and wherein the processor is further configured to obtain the quantized output data by performing a node operation on the quantized input data and the new weight and adding the new bias.

14. The neural network device of claim 13, wherein the processor is further configured to apply, to the neural network, the asymmetric input data of the N-bit fixed-point type and the weights of the N-bit floating-point type.

15. A method of quantizing parameters of a neural network, the method comprising:

analyzing a statistical distribution of parameter values of an M-bit floating-point type, the parameter values being associated with at least one layer of the neural network, M being a natural number greater than three;

obtaining a quantization level of each of parameters statistically covering a distribution range of the parameter values, based on the analyzed statistical distribution;

quantizing input data and weights of the M-bit floating-point type into asymmetric input data of an N-bit fixed-point type and weights of an N-bit floating-point type, using quantization parameters that are obtained based on the obtained quantization level of each of the parameters, N being a natural number greater than one and less than M; and applying, to the neural network, the asymmetric input data of the N-bit fixed-point type and the weights of the N-bit floating-point type, wherein the quantizing the input data and the weights of the M-bit floating-point type comprises:

obtaining a first step size that corresponds to a first gap between the obtained quantization level of each of the parameters, by using a statistical maximum value and a statistical minimum value of the parameter values, and the obtained quantization level of each of the parameters, wherein the input data is quantized based on the obtained first step size and a first zero point, the first zero point indicating a zero value of the input data of the M-bit floating-point type;

obtaining a second step size that corresponds to a second gap between a quantization level of an output data that is obtained by performing a node operation of the input data and the weights of the M-bit floating-point type, wherein the output data is quantized based on the obtained second step size and a second zero point, the second zero point indicating a zero value of the output data;

obtaining a new weight, based on the obtained first step size and the obtained second step size; and obtaining a new bias based on a bias that is not quantized, the obtained new weight, the obtained first zero point and the obtained second step size, and wherein the applying the asymmetric input data to the neural network comprises obtaining the quantized output data by performing a node operation on the quantized input data and the new weight and adding the new bias.

16. The method of claim 15, wherein the analyzing the statistical distribution comprises obtaining statistics of the parameter values of the input data, the weights and biases of the M-bit floating-point type, during pre-training of the neural network.

17. The method of claim 15, wherein the statistical distribution is approximated by a normal distribution or a Laplace distribution, and wherein the quantization level of each of the parameters is obtained based on any one or any combination of a mean, a variance, a standard deviation, a maximum value, and a minimum value of the parameter values that are obtained from the analyzed statistical distribution.

* * * * *